United States Patent
Nakahori

(10) Patent No.: US 7,193,496 B2
(45) Date of Patent: Mar. 20, 2007

(54) MAGNETIC ELEMENT AND POWER SUPPLY

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/385,664

(22) Filed: Mar. 22, 2006

(65) Prior Publication Data

US 2006/0220777 A1    Oct. 5, 2006

(30) Foreign Application Priority Data

Mar. 31, 2005   (JP) .............................. 2005-105479

(51) Int. Cl.
*H01F 27/28*   (2006.01)
(52) U.S. Cl. ........................ 336/170; 323/355
(58) Field of Classification Search .................. 336/65, 336/83, 170, 212, 220–222; 323/355, 356, 323/361

See application file for complete search history.

(56) References Cited

U.S. PATENT DOCUMENTS

| | | | | |
|---|---|---|---|---|
| 4,574,222 A | * | 3/1986 | Anderson | .................... 315/254 |
| 4,837,497 A | * | 6/1989 | Leibovich | .................... 323/345 |
| 4,876,638 A | * | 10/1989 | Silva et al. | .................... 363/97 |
| 4,994,952 A | * | 2/1991 | Silva et al. | .............. 363/56.01 |
| 5,335,163 A | * | 8/1994 | Seiersen | ..................... 363/126 |
| 5,416,458 A | * | 5/1995 | Menke et al. | .................. 336/12 |

FOREIGN PATENT DOCUMENTS

| JP | A 2003-079149 | 3/2003 |
|---|---|---|
| JP | A 2003-111413 | 4/2003 |

* cited by examiner

*Primary Examiner*—Tuyen T Nguyen
(74) *Attorney, Agent, or Firm*—Oliff & Berridge, PLC

(57) ABSTRACT

A magnetic element and a power supply which can output a plurality of different output pulse signal voltages or different output AC voltages while preventing an increase in the number of parts or an area occupied by parts are provided. The magnetic element includes a magnetic core which includes an inner leg portion, a first outer leg portion and a second outer leg portion (hereinafter referred to as the outer leg portions) which share the inner leg portion, and each of which forms a loop magnetic path together with the inner leg portion. An inner leg coil is wound around the inner leg portion, and an outer leg coil is wound around the outer leg portions. The outer leg coil is wound around the outer leg portions so that magnetic fluxes generated in the outer leg portions by a current flowing through the outer leg coil cancel each other out in the inner leg portion.

11 Claims, 21 Drawing Sheets

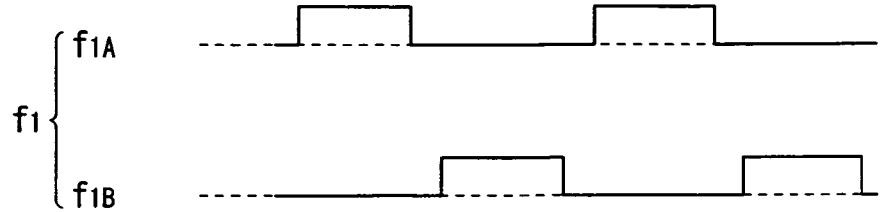
FIG. 23A  f1 { f1A, f1B
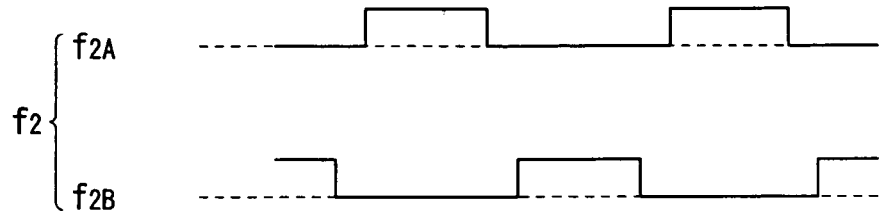
FIG. 23B  f2 { f2A, f2B
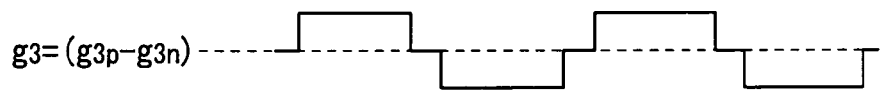
FIG. 23C  g3=(g3p-g3n)
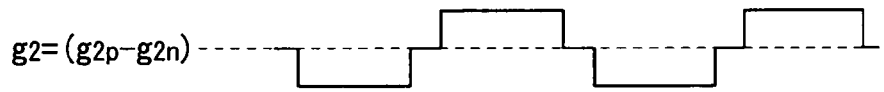
FIG. 23D  g2=(g2p-g2n)
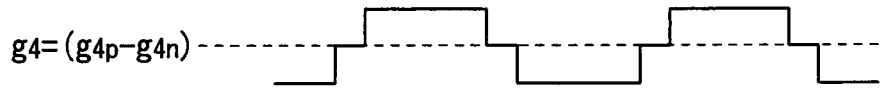
FIG. 23E  g4=(g4p-g4n)
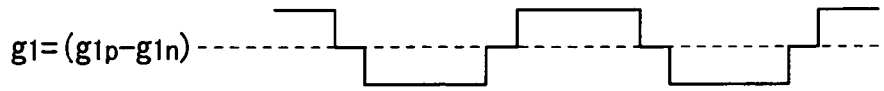
FIG. 23F  g1=(g1p-g1n)
→ T TIME

MAGNETIC ELEMENT AND POWER SUPPLY

BACKGROUND OF THE INVENTION

1. Field of the Invention

The present invention relates to a magnetic element formed through winding a coil around a magnetic core, and a power supply using the magnetic element.

2. Description of the Related Art

Various switching power supplies have been proposed and put to practical use. As described in Japanese Unexamined Patent Application Publication Nos. 2003-111413 and 2003-079149, most of them use the following system. In the system, an input DC voltage from a battery is switched by a switching operation of a switching circuit connected to an input winding of a voltage converting transformer, and an input AC voltage obtained by switching is inputted into the input winding of the voltage converting transformer, and then an output AC voltage converted by the voltage converting transformer is taken out from an output winding of the voltage converting transformer. After the voltage from the output winding is rectified by a rectifying circuit according to a switching operation of the switching circuit, the voltage is converted into a DC voltage by a smoothing circuit, and then the DC voltage is outputted.

SUMMARY OF THE INVENTION

In a switching power supply of this kind, typically a voltage converting transformer includes one input terminal pair. It is because when a plurality of different input AC voltages are inputted into input windings of a multiple-input/multiple-output type voltage converting transformer which includes a plurality of input windings and a plurality of output windings, the input windings are magnetically coupled to one another, thereby an input AC voltage inputted into one of the input windings may be leaked to another input winding. Therefore, in the case where a plurality of different input AC voltages are inputted into the voltage converting transformer, a voltage converting transformer is arranged depending upon the number of input AC voltages to be inputted.

Moreover, in a switching power supply including a 1-input/multiple-output type voltage converting transformer, a plurality of output AC voltages with the same phases can be outputted from the voltage converting transformer at the same time by characteristics of the transformer; however, it is difficult to output a plurality of output AC voltages with different phases at the same time. Therefore, in the case where output AC voltages with different phases are outputted from the voltage converting transformer at the same time, that is, in the case where a plurality of input AC voltages with different phases are inputted into the voltage converting transformer, as in the case of the above-described case, a voltage converting transformer is arranged depending upon the number of input AC voltages to be inputted.

Thus, it is necessary to arrange the voltage converting transformer depending upon the number of input AC voltages to be inputted, so when the number of input AC voltages to be inputted increases, it is necessary to add the voltage converting transformer. Therefore, there is an issue that the number of parts increases, thereby a space occupied by parts on a circuit substrate increases.

In view of the foregoing, it is desirable to provide a magnetic element and power supply which can prevent an increase in the number of parts or a space occupied by parts, compared to the case where a plurality of independent magnetic elements or independent power supplies are arranged.

According to an embodiment of the invention, there is provided a magnetic element including: a magnetic core including an inner leg portion and a plurality of outer leg portions which share the inner leg portion, the plurality of outer leg portions each of which forms a loop magnetic path together with the inner leg portion. An inner leg coil is wound around the inner leg portion of the magnetic core, and an outer leg coil is wound around the outer leg portions of the magnetic core. The outer leg coil is wound around the outer leg portions so that magnetic fluxes generated in the plurality of outer leg portions by a current flowing through the outer leg coil cancel each other out in the inner leg portion.

The above "cancel each other out in the inner leg portion" means that combined physical characteristics of one outer leg coil portion and one outer leg portion around which the one outer leg coil portion is wound and combined physical characteristics of another outer leg coil portion and another outer leg portion around which the outer leg portion is wound are the same in a relationship with the inner leg coil.

More specifically, the outer leg coil includes a first outer leg coil portion and a second outer leg coil portion, and the first outer leg coil portion is wound around an outer leg portion of one loop magnetic path, and the second outer leg coil portion is wound around an outer leg portion of another loop magnetic path. At this time, the winding directions of the first and the second outer leg coil portions are in the same polarity direction, and the numbers of turns in the first outer leg coil portion and the second outer leg coil portion are equal to each other. In this case, "the same polarity direction" means that the directions of the magnetic fluxes generated in the outer leg portions by a current flowing through each outer leg coil portion are the same.

In the above embodiment, in order to make the numbers of turns in the first outer leg coil portion and the second outer leg coil portion equal to each other, and thereby to make combined physical characteristics of the first outer leg coil portion and the outer leg portion around which the first outer leg coil portion is wound and combined physical characteristics of the second outer leg coil portion and the outer leg portion around which the second outer leg coil portion is wound the same in a relationship with the inner leg coil, it is necessary that the materials, the shapes, the sizes and the like of the outer leg portion around which the first outer leg coil portion is wound and the outer leg portion around which the second outer leg coil portion is wound are the same.

According to an embodiment of the invention, there is provided a power supply including: a magnetic element which transforms a first input AC voltage and a second input AC voltage to output them as a first output AC voltage and a second output AC voltage; and a rectifying/smoothing circuit which rectifies and smoothes the first and the second output AC voltages.

More specifically, the magnetic element of the above power supply includes the following components (A) through (I):

(A) a magnetic core including an inner leg portion and a plurality of outer leg portions which share the inner leg portion, the plurality of outer leg portions each of which forms a loop magnetic path together with the inner leg portion;

(B) an input inner leg coil which is wound around the inner leg portion, the input inner leg coil into which the first output AC voltage is inputted;

(C) an output inner leg coil which is wound around the inner leg portion, and outputs the first output AC voltage;

(D) an input outer leg coil which is wound around the outer leg portion, the input outer leg coil into which the second input AC voltage is inputted;

(E) an output outer leg coil which is wound around the outer leg portion, and outputs the second output AC voltage;

(F) the input outer leg coil is formed through connecting a first input outer leg coil portion wound around an outer leg portion of one loop magnetic path and a second input outer leg coil portion wound around an outer leg portion of another loop magnetic path in series;

(G) the output outer leg coil is formed through a first output outer leg coil portion wound around an outer leg portion of one loop magnetic path and a second output outer leg coil portion wound around an outer leg portion of another loop magnetic path in series, (H) the input outer leg coil is wound around the outer leg portions so that magnetic fluxes generated in the plurality of outer leg portions by a current flowing through the input outer leg coil cancel each other out in the inner leg portion, and (I) the output outer leg coil is wound around the outer leg portions so that magnetic fluxes generated in the plurality of outer leg portions by a current flowing through the output outer leg coil cancel each other out in the inner leg portion.

In the magnetic element and the power supply according to the embodiment of the invention, magnetic fluxes generated in the plurality of outer leg portions by a current flowing through the outer leg coil cancel each other out in the inner leg portion, so a voltage is not substantially induced from the outer leg coil to the inner leg coil. On the other hand, the combined physical characteristics of one outer leg coil portion and one outer leg portion around which the outer leg coil portion is wound and the combined physical characteristics of another outer leg coil portion and another outer leg portion around which the outer leg coil portion is wound are the same in a relationship with the inner leg coil, so magnetic fluxes generated in the plurality of outer leg portions by a current flowing through the inner leg coil cancel each other out in the outer leg portions, so a voltage is not substantially induced from the inner leg coil to the outer leg coil. Thereby, in spite of the fact that the inner leg coil and the outer leg coil are wound around the common magnetic core, there is no possibility that the inner leg coil and the outer leg coil interact with each other.

As long as the inner leg coil and the outer leg coil do not interact with each other, the inner leg coil and the outer leg coil can have the following various structures, for example. The inner leg coil and the outer leg coil may be single coils functioning as inductors, or either the inner leg coil or the outer leg coil may be a transformer coil set including an input coil and an output coil, and the other may be a single coil functioning as an inductor. Moreover, each of the inner leg coil and the outer leg coil may be a transformer coil set.

In the transformer coil set, the number of outer leg coils corresponding to one input coil may be 1 or 2 or more, and the transformer coil set may include one input and one output, or one input and two outputs. At this time, the magnetic element includes 2 inputs and 2 outputs, 2 inputs and 3 outputs, 2 inputs and 4 outputs, or the like.

In the case where 2n (n is a positive integer) number of loop magnetic paths are arranged, when the first outer leg coil portion and the second outer leg coil portion are wound according to the above embodiment, a maximum of n number of outer leg coils can be included. At this time, the magnetic element includes n+1 number of inputs and a number which is an integer equal to or larger than n+1 of outputs.

The inner leg coil and the outer leg coil with the above various structures can be applied to a voltage converting transformer of a power supply, an insulating type pulse transformer used in a signal transmission path, or the like. For example, in the case where a pulse transformer including the inner leg coil and the outer leg coil each of which is a transformer coil set is applied to the signal transmission path, when an input pulse signal voltage is inputted into each input coil (the input inner leg coil and the input outer leg coil), an output pulse signal voltage corresponding to the input pulse signal voltage is outputted from each output coil (the output inner leg coil and the output outer leg coil).

Moreover, in the case where a voltage converting transformer including the inner leg coil and the outer leg coil each of which is a transformer coil set is applied to a power supply, when an input AC voltage is inputted into each input coil (the input inner leg coil and the input outer leg coil), an output AC voltage corresponding to the input AC voltage is outputted from each output coil (the output inner leg coil and the output outer leg coil). At this time, the turn ratio between the input inner leg coil and the output inner leg coil may be the same as or different from the turn ratio between the input outer leg coil and the output outer leg coil.

The above power supply has a function as an AC-AC converter which inputs an input AC voltage into the magnetic element, and outputs an output AC voltage from the magnetic element; however, when a rectifying/smoothing circuit is disposed in a stage behind the magnetic element, the power supply can have a function as an AC-DC converter, or when a switching circuit is disposed in a stage before the magnetic element, the power supply can have a function as a DC-AC converter. Moreover, when a rectifying/smoothing circuit is disposed in a stage behind the magnetic element, and a switching circuit is disposed in a stage before the magnetic element, the power supply can have a function as a DC-DC converter.

In the magnetic element according to the embodiment of the invention, the inner leg coil and the outer leg coil do not interact with each other, so a plurality of independent input/output operations can be performed through the use of the inner leg coil and the outer leg coil. Thereby, a plurality of magnetic cores which are necessary corresponding to the number of inputs when inputting a plurality of different input pulse signal voltages or different input AC voltages can be combined, so as a result, the number of magnetic cores and a space occupied by the magnetic cores can be reduced.

Moreover, in the power supply according to the embodiment of the invention, in the case where a plurality of independent power supplies are combined into one through the use of the magnetic element according to the embodiment of the invention, a plurality of magnetic elements, a plurality of switching circuits, a plurality of rectifying/smoothing circuits and the like which have a common function can be combined. Thereby, the number of parts can be reduced, and a space occupied by parts can be reduced. Therefore, compared to the case where a plurality of independent power supplies are arranged, while preventing an increase in the number of parts or an area occupied by parts, a plurality of different output AC voltages can be outputted from a single magnetic element.

Moreover, in the power supply according to the embodiment of the invention, in the case where each of the inner leg coil and the outer leg coil is a transformer coil set, and the turn ratio in one of the transformer sets (Nb/Na; the number of turns in an input coil Na, the number of turns in an output coil Nb) is larger than the turn ratio in the other transformer set (Nd/Nc; the number of turns in an input coil Nc, the number of turns in an output coil Nd), when an input AC voltage is reduced to be much lower than a usually used voltage, an output AC voltage can be outputted from the magnetic element at a decreasing rate which is lower than that of an input AC voltage inputted into the magnetic element, or a decreasing rate of zero through converting from one of the transformer coil sets in which the turn ratio is relatively small to the transformer coil set in which the turn ratio is relatively large.

Further, in the magnetic element and the power supply according to the embodiment of the invention, as described above, they do not interact with each other, so in addition to using a transformer coil set on an inner leg side and a transformer coil set on an outer leg side alternately, the transformer coil set on the inner leg side and the transformer coil set on the outer leg side can be used at the same time.

Other and further objects, features and advantages of the invention will appear more fully from the following description.

BRIEF DESCRIPTION OF THE DRAWINGS

FIGS. 23A through 23F are waveform diagrams of an input AC voltage and an output AC voltage of a driving circuit shown in FIG. 26;

DETAILED DESCRIPTION OF THE PREFERRED EMBODIMENTS

Preferred embodiments will be described in detail below referring to the accompanying drawings.

Figure 1:
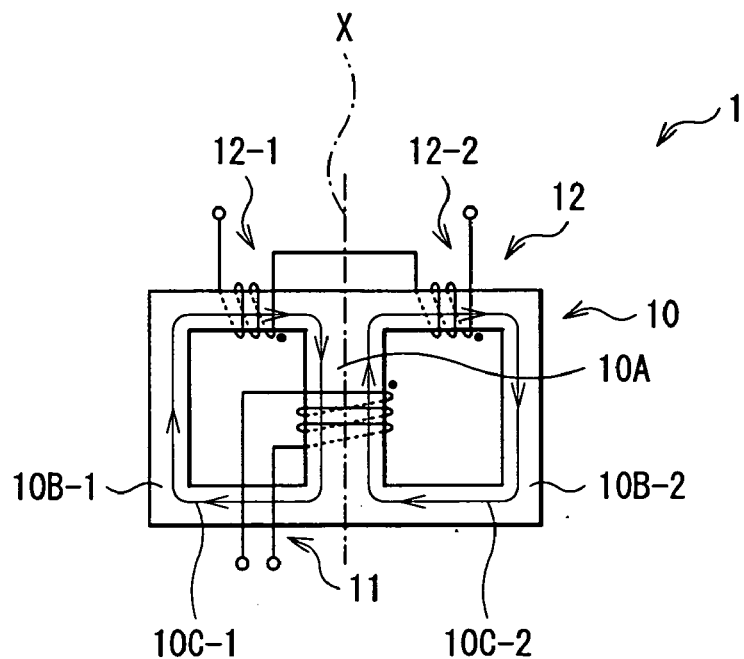
FIG. 1 is a circuit diagram of a magnetic element according to an embodiment of the invention.

FIG. 1 shows a schematic structure of a magnetic element 1 according to an embodiment of the invention. The magnetic element 1 includes a magnetic core 10, an inner leg coil 11 and an outer leg coil 12.

The magnetic core 10 includes an inner leg portion 10A, a first outer leg portion 10B-1 which forms a first loop magnetic path with the inner leg portion 10A while sharing the inner leg portion 10A, and a second outer leg portion 10B-2 which forms a second loop magnetic path with the inner leg portion 10A while sharing the inner leg portion 10A. In the embodiment, the first outer leg portion 10B-1 and the second outer leg portion 10B-2 are made of the same material with the same shape and the same size.

The inner leg coil 11 is wound around the inner leg portion 10A of the magnetic core 10, and is made of, for example, a single coil which functions as an inductor. The outer leg coil 12 includes a first outer leg coil portion 12-1 and a second outer leg coil portion 12-2, and is wound continuously from the first outer leg portion 10B-1 of the magnetic core 10 to the second outer leg portion 10B-2 of the magnetic core 10. The outer leg coil 12 is made of, for example, a single coil which functions as an inductor.

More specifically, the first outer leg coil portion 12-1 is wound around the first outer leg portion 10B-1 of the first loop magnetic path 10C-1, and the second outer leg coil portion 12-2 is wound around the second outer leg portion 10B-2 of the second loop magnetic path 10C-2. At this time, the winding directions of the first outer leg coil portion 12-1 and the second outer leg coil portion 12-2 are in the same polarity direction, and the numbers of turns in the first outer leg coil portion 12-1 and the second outer leg coil portion 12-2 are equal to each other. In this case, the same polarity direction means that the directions of magnetic fluxes generated in the first outer leg portion 10B-1 and the second outer leg portion 11B-2 by a current flowing through the first outer leg coil portion 12-1 and the second outer leg portion 12-2 are the same.

Thus, the first outer leg portion 10B-1 and the second outer leg portion 10B-2 are made of the same material with the same shape and the same size, and the numbers of turns in the first outer leg coil portion 12-1 and the second outer leg coil portion 12-2 and the winding methods of the first outer leg coil portion 12-1 and the second outer leg coil portion 12-2 are equal to each other, so combined physical characteristics of the first outer leg coil portion 12-1 and the first outer leg portion 10B-1 around which the first outer leg coil portion 12-1 is wound (hereinafter referred to as first physical characteristics), and combined physical characteristics of the second outer leg coil portion 12-2 and the second outer leg portion 10B-2 around which the second outer leg coil portion 12-2 is wound (hereinafter referred to as second physical characteristics) are the same in a relationship with the inner leg coil 11.

The structure of the magnetic element 1 in which the first physical characteristics and the second physical characteristics are "the same" in the relationship with the inner leg coil 11 is not limited to the above-described structure, and the materials, the shapes, the sizes and the like of the outer leg portion 10B-1 and the outer leg portion 10B-2 may be different from each other. However, in such a case, it is necessary to appropriately adjust the numbers of turns in the first outer leg coil portion 12-1 and the second outer leg coil portion 12-2, or the like.

Moreover, as long as the first physical characteristics and the second physical characteristics are the same in the relationship with the inner leg coil 11, the magnetic element 1 may have a structure in which the winding methods of the first outer leg coil portion 12-1 and the second outer leg coil portion 12-2 are different from each other, for example, a structure in which the winding positions of the first outer leg coil portion 12-1 and the second outer leg coil portion 12-2 are not axisymmetric with reference to a central axis X in an extending direction of the inner leg coil 11.

Figure 2:
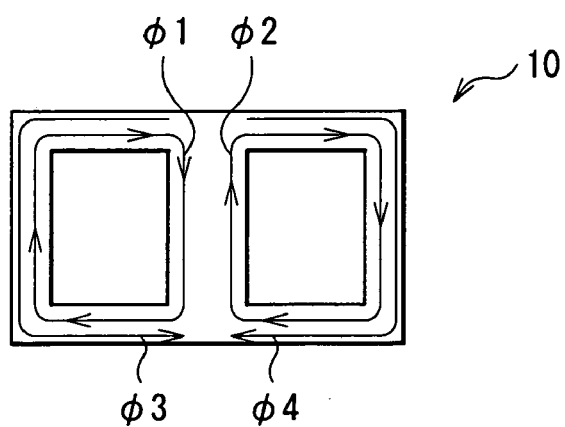
FIG. 2 is a conceptual diagram for describing the flow of magnetic fluxes in the magnetic element shown in FIG. 1.

Thereby, as shown in FIG. 2, a magnetic flux $\phi1$ and a magnetic flux $\phi2$ generated in the first outer leg portion 10B-1 and the second outer leg portion 10B-2, respectively, by a current flowing through the outer leg coil 12 cancel each other out in the inner leg portion 10A, so a voltage is not substantially induced from the outer leg coil 12 to the inner leg coil 11. On the other hand, magnetic fluxes $\phi3$ and $\phi4$ generated in a loop magnetic path including the first outer leg portion 10B-1 and a loop magnetic path including the second outer leg portion 10B-2, respectively, by a current flowing through the inner leg coil 11 cancel each other out in the loop magnetic paths, so a voltage is not substantially induced from the inner leg coil 11 to the outer leg coil 12. Thereby, in spite of the fact that the inner leg coil 11 and the outer leg coil 12 are wound around the common magnetic core 10, there is no possibility that the inner leg coil 11 and the outer leg coil 12 interact with each other.

In the magnetic element 1 according to the embodiment, the inner leg coil 11 and the outer leg coil 12 do not interact with each other, so a plurality of independent input/output operations can be separately performed through the use of the inner leg coil 11 and the outer leg coil 12. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

Moreover, in the magnetic element 1 according to the embodiment, the inner leg coil 11 and the outer leg coil 12 do not interact with each other, so in addition to using the inner leg coil 11 and the outer leg coil 12 alternately, they may be used at the same time.

Figure 3:
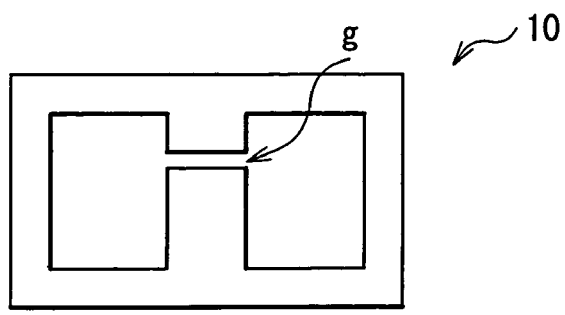
FIG. 3 is a schematic diagram of a modification of a magnetic core shown in FIG. 1.

As shown in FIG. 3, an air gap g may be formed in the inner leg portion 10A of the magnetic core 10. Thereby, when the air gap g becomes larger, compared to the case where there is no air gap g, or the air gap g is small, magnetic coupling between the first outer leg coil portion 12-1 and the second outer leg coil portion 12-2 becomes stronger. On the other hand, when the air gap g is reduced, compared to the case where the air gap g is large, magnetic coupling between the first outer leg coil portion 12-1 and the second outer leg coil portion 12-2 becomes weaker.

[First Modification]

Figure 4:
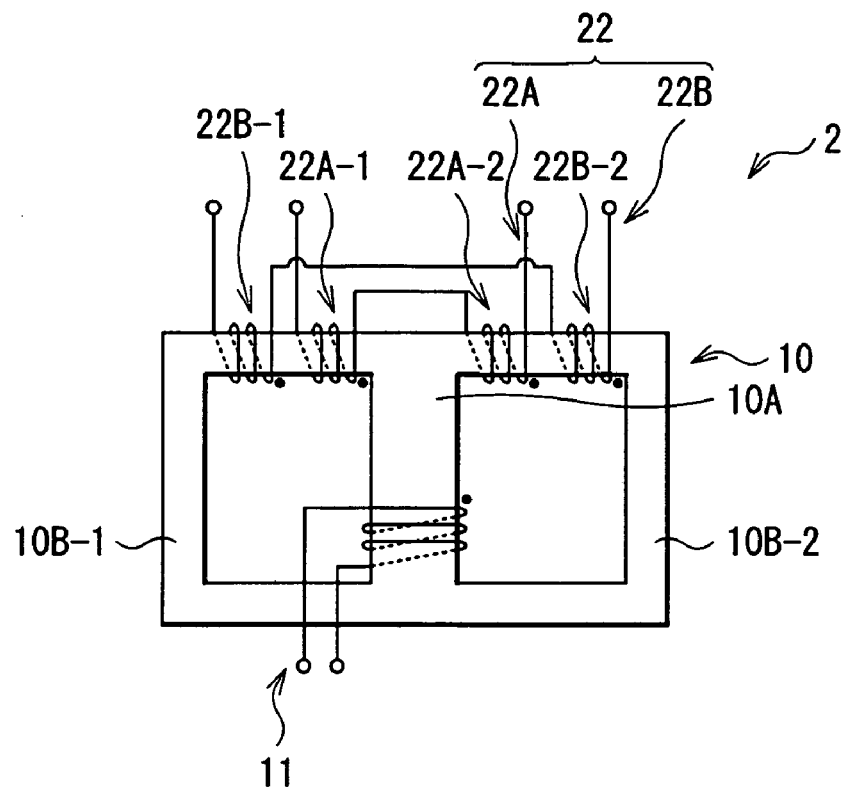
FIG. 4 is a circuit diagram of a magnetic element according to a first modification.

FIG. 4 shows a schematic structure of a magnetic element 2 according to a first modification of the above embodiment. The magnetic element 2 includes an outer leg coil 22 instead of the outer leg coil 12 of the magnetic element 1. Therefore, mainly the outer leg coil 22 will be described below.

The outer leg coil 22 is a transformer coil set including an input outer leg coil 22A (an input coil) and an output outer leg coil 22B (an output coil), and the input outer leg coil 22A and the output outer leg coil 22B are wound continuously from the first outer leg portion 10B-1 of the magnetic core 10 to the second outer leg portion 10B-2 of the magnetic core 10.

More specifically, the input outer leg coil 22A includes a first outer leg coil portion 22A-1 (a first input outer leg coil portion) and a second outer leg coil portion 22A-2 (a second input outer leg coil portion), and the outer leg coil portion 22A-1 is wound around the first outer leg portion 10B-1 of the first loop magnetic path 10C-1, and the outer leg coil portion 22A-2 is wound around the second outer leg portion 10B-2 of the second loop magnetic path 10C-2. At this time, the winding directions of the outer leg coil portion 22A-1 and the outer leg coil portion 22A-2 are in the same polarity direction, and the numbers of turns in the outer leg coil portion 22A-1 and the outer leg coil portion 22A-2 are equal to each other. In this case, the same polarity direction means that the directions of magnetic fluxes generated in the first outer leg portion 10B-1 and the second outer leg portion 10B-2 by a current flowing through the outer leg coil portions 22A-1 and 22A-2 are the same.

Moreover, the output outer leg coil 22B includes a first outer leg coil portion 22B-1 (a first output outer leg coil portion) and a second outer leg coil portion 22B-2 (a second output outer leg coil portion), and the first outer leg coil portion 22B-1 is wound around the first outer leg portion 10B-1 of the first loop magnetic path 10C-1, and the second outer leg coil portion 22B-2 is wound around the second outer leg portion 10B-2 of the second loop magnetic path 10C-2. At this time, the winding directions of the outer leg coil portion 22B-1 and the outer leg coil portion 22B-2 are in the same polarity direction, and the numbers of turns in the outer leg coil portions 22B-1 and the outer leg coil portion 22B-2 are equal to each other. In this case, the same polarity direction means that the directions of magnetic fluxes generated in the first outer leg protion 10B-1 and the second outer leg portion 10B-2 by a current flowing through the outer leg coil portions 22B-1 and 22B-2 are the same.

Thereby, in the magnetic element 2 according to the modification, the inner leg coil 11 and the outer leg coil 22 do not interact with each other, so a plurality of independent input/output operations can be performed through the use of the inner leg coil 11 and the outer leg coil 22. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

[Second Modification]

Figure 5:
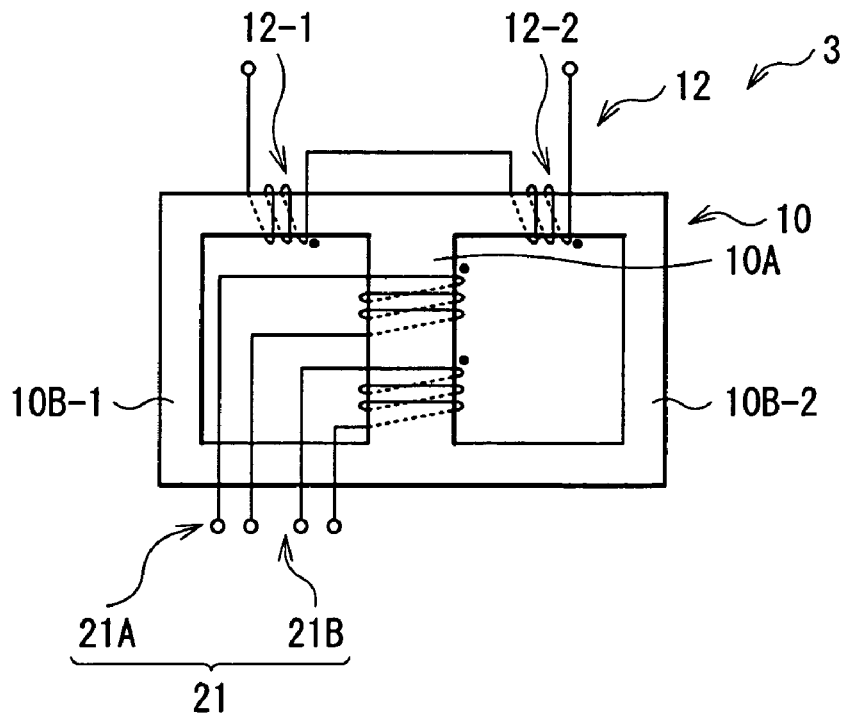
FIG. 5 is a circuit diagram of a magnetic element according to a second modification.

FIG. 5 shows a schematic structure of a magnetic element 3 according to a second modification of the above embodiment. The magnetic element 3 includes an inner leg coil 21 instead of the inner leg coil 11 of the magnetic element 1. Therefore, mainly the inner leg coil 21 will be described below.

The inner leg coil 21 is a transformer coil set including an input inner leg coil 21A (an input coil) and an output inner leg coil 21B (an output coil). The input inner leg coil 21A and the output inner leg coil 21B are wound around the inner leg portion 10A of the magnetic core 10.

Thereby, in the magnetic element 3 according to the modification, the inner leg coil 21 and the outer leg coil 12 do not interact with each other, so a plurality of independent input/output operations can be performed through the use of the inner leg coil 21 and the outer leg coil 12. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of different magnetic elements are arranged, while an increase in the number of parts and an area occupied by parts is prevented, a plurality of different output pulse signal voltages or different output AC voltages can be outputted.

[Third Modification]

Figure 6:
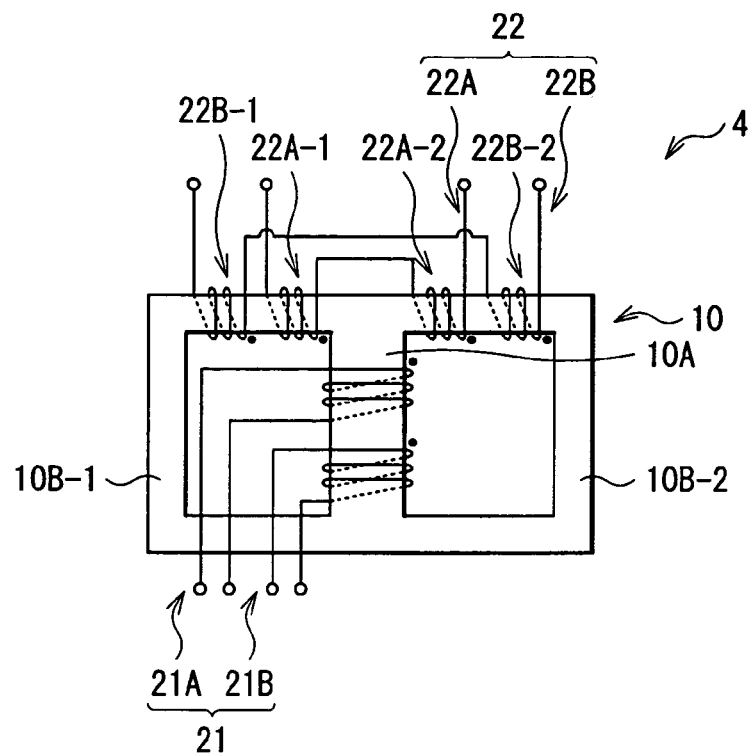
FIG. 6 is a circuit diagram of a magnetic element according to a third modification.

FIG. 6 shows a schematic structure of a magnetic element 4 according to a third modification of the above embodiment. The magnetic element 4 includes the outer leg coil 22 instead of the outer leg coil 12 of the magnetic element 1, and the inner leg coil 21 instead of the inner leg coil 11 of the magnetic element 1. Thereby, in the magnetic element 4 according to the modification, the inner leg coil 21 and the outer leg coil 22 do not interact with each other, so a plurality of independent input/output operations can be performed through the use of the inner leg coil 21 and the outer leg coil 22. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

[Fourth Modification]

Figure 7:
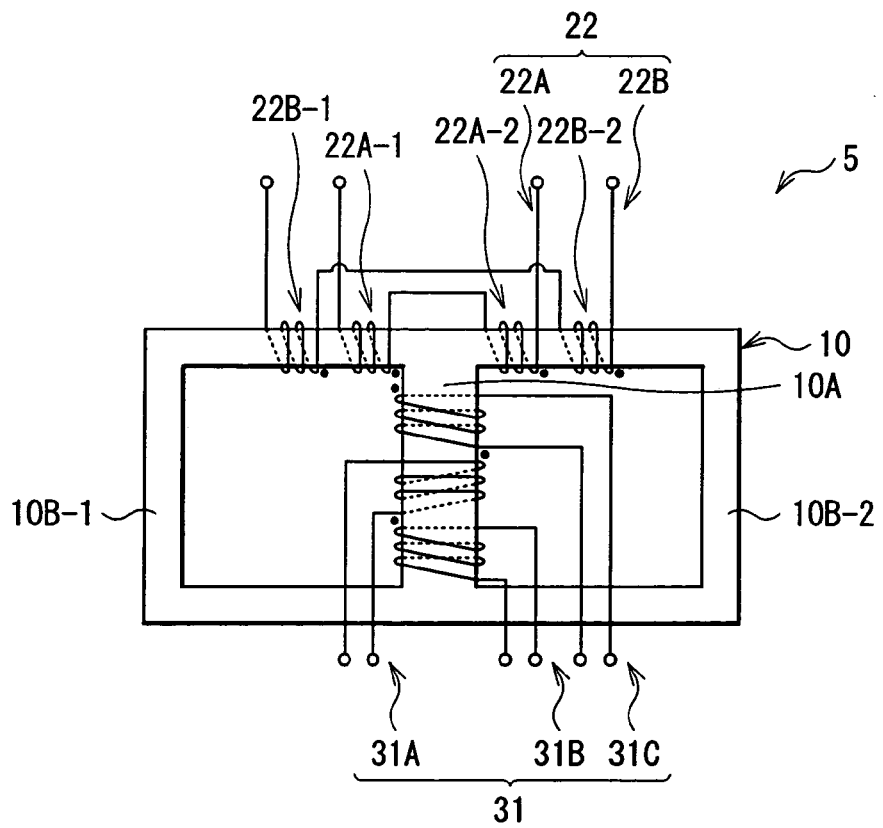
FIG. 7 is a circuit diagram of a magnetic element according to a fourth modification.

FIG. 7 shows a schematic structure of a magnetic element 5 according to a fourth modification of the embodiment. The magnetic element 5 includes an inner leg coil 31 instead of the inner leg coil 21 of the magnetic element 4. Therefore, mainly the inner leg coil 31 will be described below.

The inner leg coil 31 is a transformer coil set including an input inner leg coil 31A, an output inner leg coil 31B (a first output inner leg coil) and an output inner leg coil 31C (a second output inner leg coil). The output inner leg coil 31B and the output inner leg coil 31C are wound around the inner leg portion 10A of the magnetic core 10.

Thereby, in the magnetic element 5 according to the modification, the inner leg coil 31 and the outer leg coil 22 do not interact with each other, so a plurality of independent input/output operations can be performed through the use of the inner leg coil 31 and the outer leg coil 22. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

[Fifth Modification]

Figure 8:
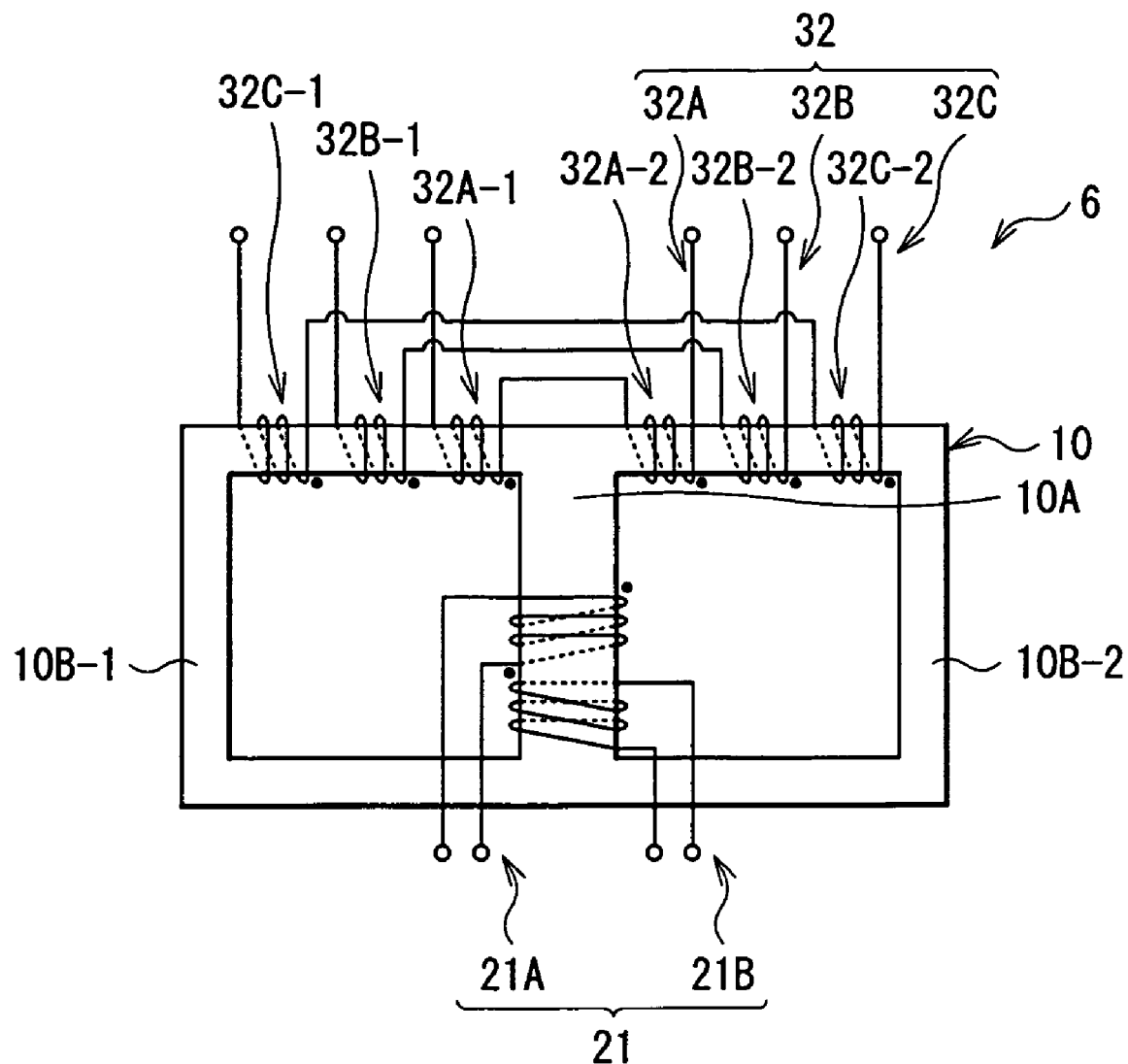
FIG. 8 is a circuit diagram of a magnetic element according to a fifth modification.

FIG. 8 shows a schematic structure of a magnetic element 6 according to a fifth modification of the above embodiment. The magnetic element 6 includes an outer leg coil 32 instead of the outer leg coil 22 of the above magnetic element 4. Therefore, mainly the outer leg coil 32 will be described below.

The outer leg coil 32 is a transformer coil set including an input outer leg coil 32A, an output outer leg coil 32B and an output outer leg coil 32C, and the input outer leg coil 32A, the output outer leg coil 32B (a first output outer leg coil) and the output outer leg coil 32C (a second output outer leg coil) are wound continuously from the first outer leg portion 10B-1 of the magnetic core 10 to the second outer leg portion 10B-2 of the magnetic core 10.

More specifically, the input outer leg coil 32A includes an first outer leg coil portion 32A-1 (a first input outer leg coil portion) and a second outer leg coil portion 32A-2 (a second input outer leg coil portion), and the outer leg coil portion 32A-1 is wound around the first outer leg portion 10B-1 of the first loop magnetic path 10C-1, and the outer leg coil portion 32A-2 is wound around the second outer leg portion 10B-2 of the second loop magnetic path 10C-2. At this time, the winding directions of the outer leg coil portion 32A-1 and the outer leg coil portion 32A-2 are in the same polarity direction, and the numbers of turns in the outer leg coil portion 32A-1 and the outer leg coil portion 32A-2 are equal to each other. In this case, the same polarity direction means that the directions of magnetic fluxes generated in the first outer leg portion 10B-1 and the second outer leg portion 10B-2 by a current flowing through the outer leg coil portion 32A-1 and the outer leg coil portion 32A-2 are the same.

Moreover, the output outer leg coil 32B includes a first outer leg coil portion 32B-1 (a first output outer leg coil portion) and a second outer leg coil portion 32B-2 (a second output outer leg coil portion), and the outer leg coil portion 32B-1 is wound around the first outer leg portion 10B-1 of the first loop magnetic path 10C-1, and the outer leg coil portion 32B-2 is wound around the second outer leg portion 10B-2 of the second loop magnetic path 10C-2. At this time, the winding directions of the outer leg coil portion 32B-1 and the outer leg coil portion 32B-2 are in the same polarity direction, and the numbers of turns in the outer leg coil portion 32B-1 and the outer leg coil portion 32B-2 are equal to each other. In this case, the same polarity direction means that the directions of magnetic fluxes generated in the first outer leg portion 10B-1 and the second outer leg portion 10B-2 by a current flowing through the outer leg coil portion 32B-1 and the outer leg coil portion 32B-2 are the same.

Moreover, the output outer leg coil 32C includes a first outer leg coil portion 32C-1 (a first output outer leg coil portion) and a second outer leg coil portion 32C-2 (a second output outer leg coil portion), and the outer leg coil portion 32C-1 is wound around the first outer leg portion 10B-1 of the first loop magnetic path 10C-1, and the outer leg coil portion 32C-2 is wound around the second outer leg portion 10B-2 of the second loop magnetic path 10C-2. At this time, the winding directions of the outer leg coil portion 32C-1 and the outer leg coil portion 32C-2 are in the same polarity direction, and the numbers of turns in the outer leg coil portion 32C-1 and the outer leg coil portion 32C-2 are equal to each other. In this case, the same polarity direction means that the directions of magnetic fluxes generated in the first outer leg portion 10B-1 and the second outer leg portion 10B-2 by a current flowing through the outer leg coil portion 32C-1 and the outer leg coil portion 32C-2 are the same.

Thereby, in the magnetic element 6 according to the modification, the inner leg coil 21 and the outer leg coil 32 do not interact with each other, so a plurality of independent input/output operations can be performed through the use of the inner leg coil 21 and the outer leg coil 32. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

[Sixth Modification]

Figure 9:
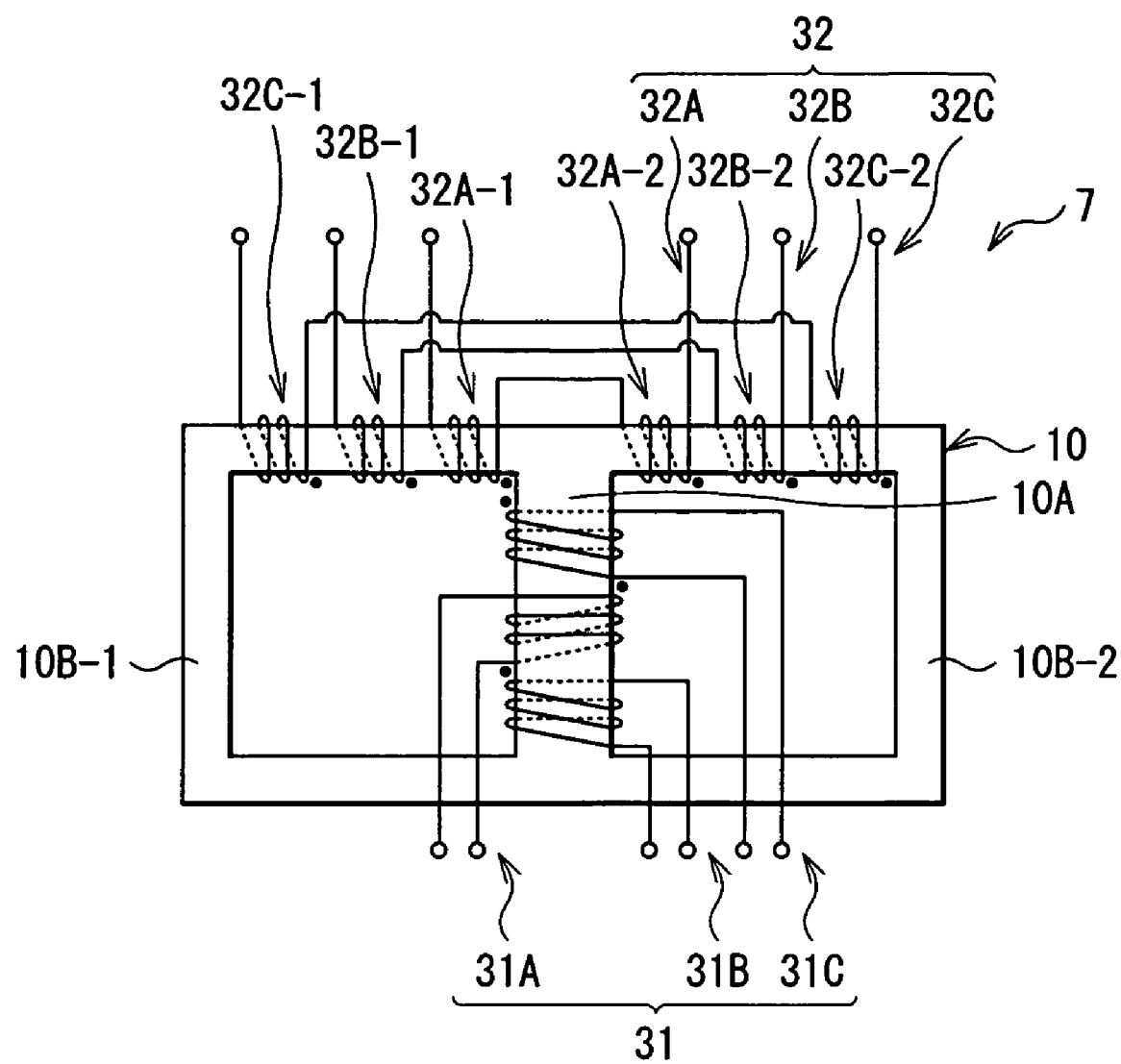
FIG. 9 is a circuit diagram of a magnetic element according to a sixth modification.

FIG. 9 shows a schematic structure of a magnetic element 7 according to a sixth modification of the above embodiment. The magnetic element 7 include the outer leg coil 32 instead of the outer leg coil 22 of the magnetic element 4 and the inner leg coil 31 instead of the inner leg coil 21 of the magnetic element 4. Thereby, in the magnetic element 7 according to the modification, the inner leg coil 31 and the outer leg coil 32 do not interact with each other, so a plurality of independent input/output operations can be performed through the use of the inner leg coil 31 and the outer leg coil 32. Thereby, a plurality of magnetic cores 10 which are necessary corresponding to the number of inputs when inputting a plurality of different input pulse signal voltages or different input AC voltages in related arts can be combined, so as a result, the number of magnetic cores 10 and a space occupied by the magnetic cores 10 can be reduced. Therefore, compared to the case where a plurality of independent magnetic elements are arranged, while an increase in the number of parts and an area occupied by parts is prevented, a plurality of different output pulse signal voltages or different output AC voltages can be outputted.

FIRST APPLICATION EXAMPLE

Figure 11:
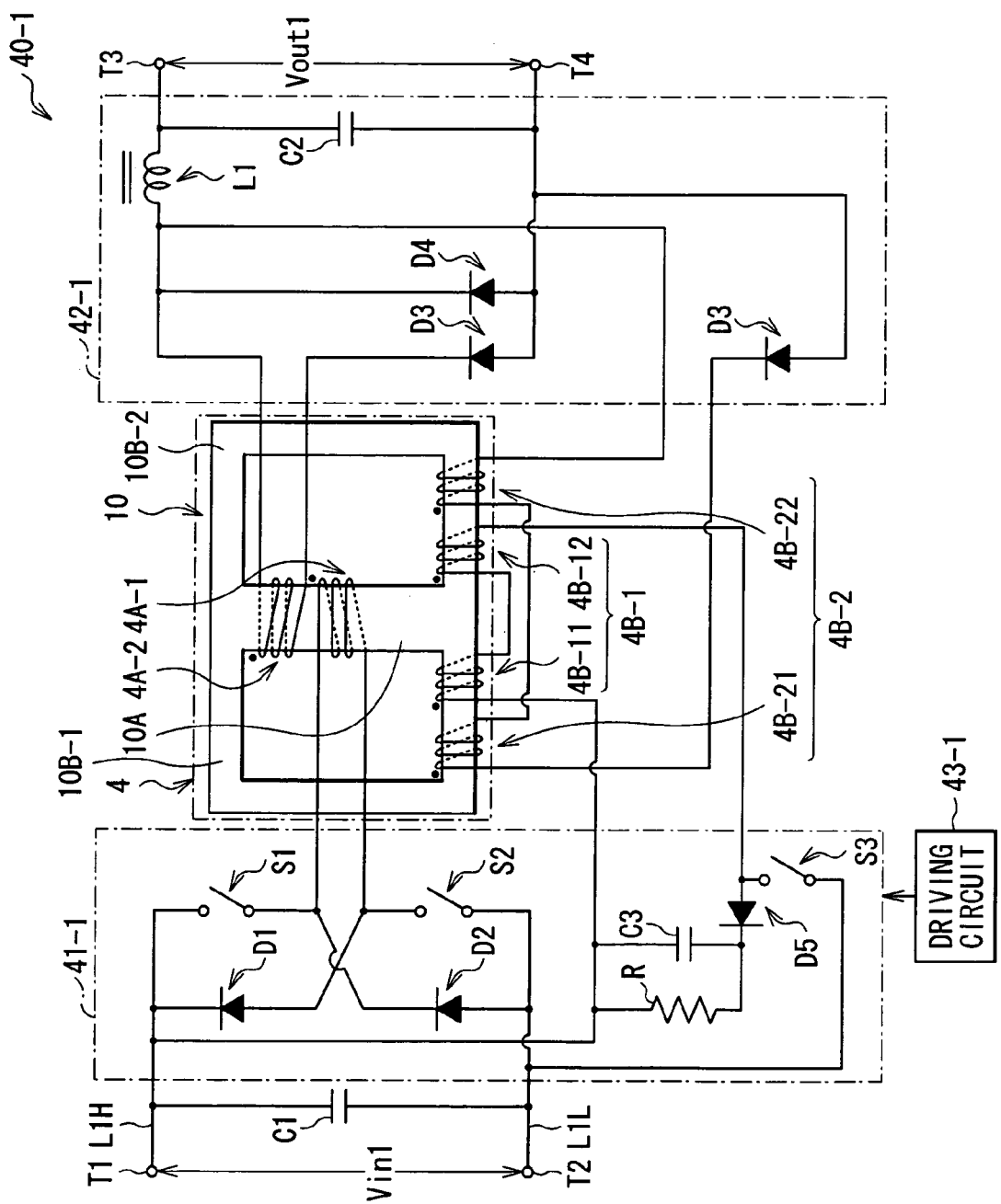
FIG. 11 is a circuit diagram of a power supply according to an application example of the magnetic element shown in FIG. 4.
Figure 12:
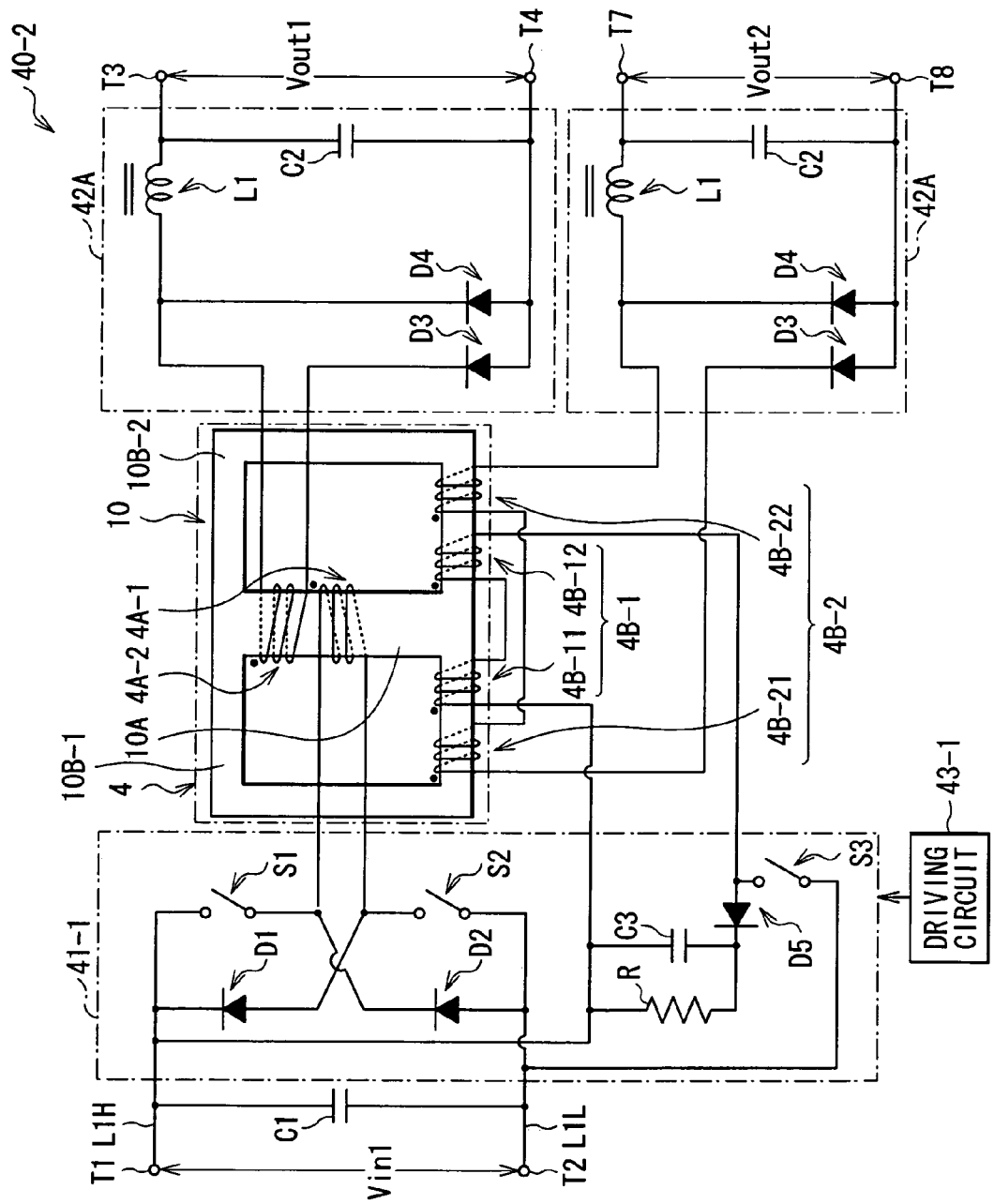
FIG. 12 is a circuit diagram of another power supply according to the application example of the magnetic element shown in FIG. 4.
Figure 13:
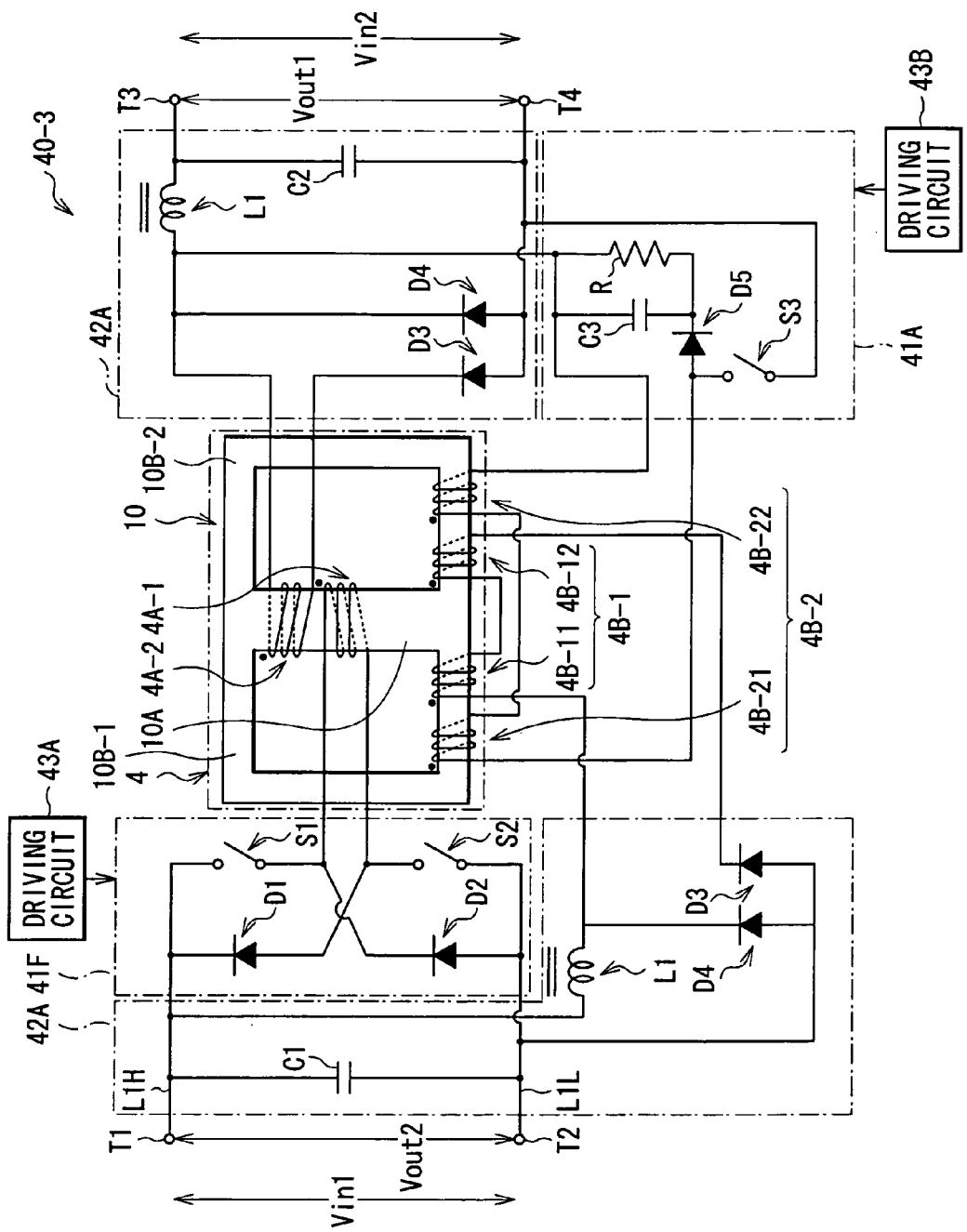
FIG. 13 is a circuit diagram of still another power supply according to the application example of the magnetic element shown in FIG. 4.

FIGS. 11 through 13 show schematic structures of power supplies 40-1 through 40-3 using the magnetic element 4 (2-input/2-output type) according to the third modification.

Figure 10A:
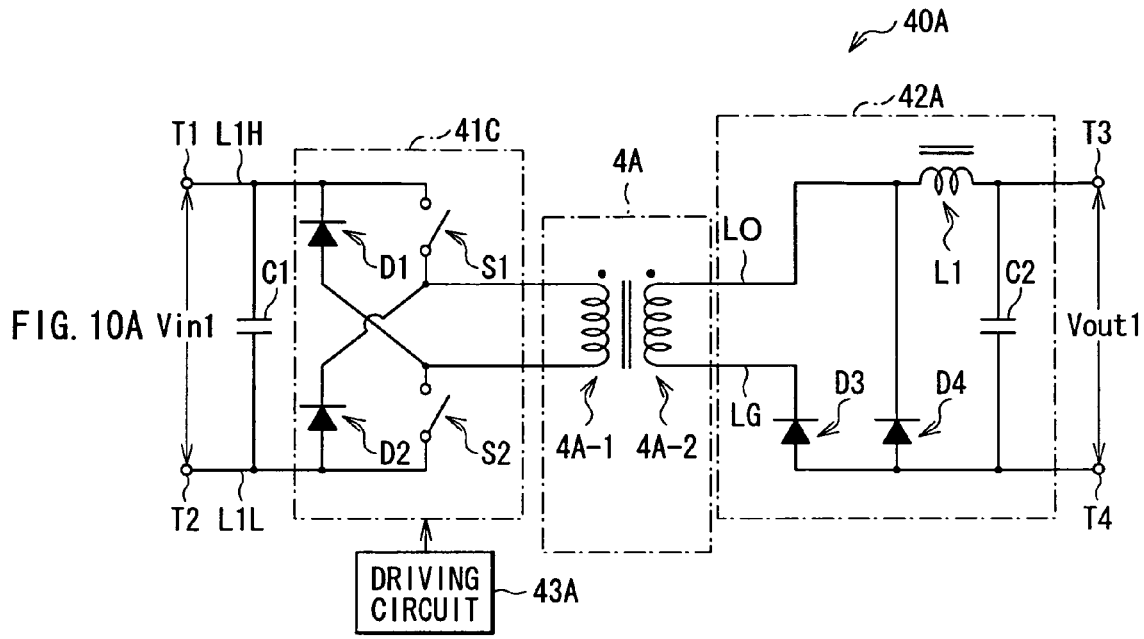
FIGS. 10A and 10B are circuit diagrams for describing a power supply according to an application example of the magnetic element shown in FIG. 4.
Figure 10B:
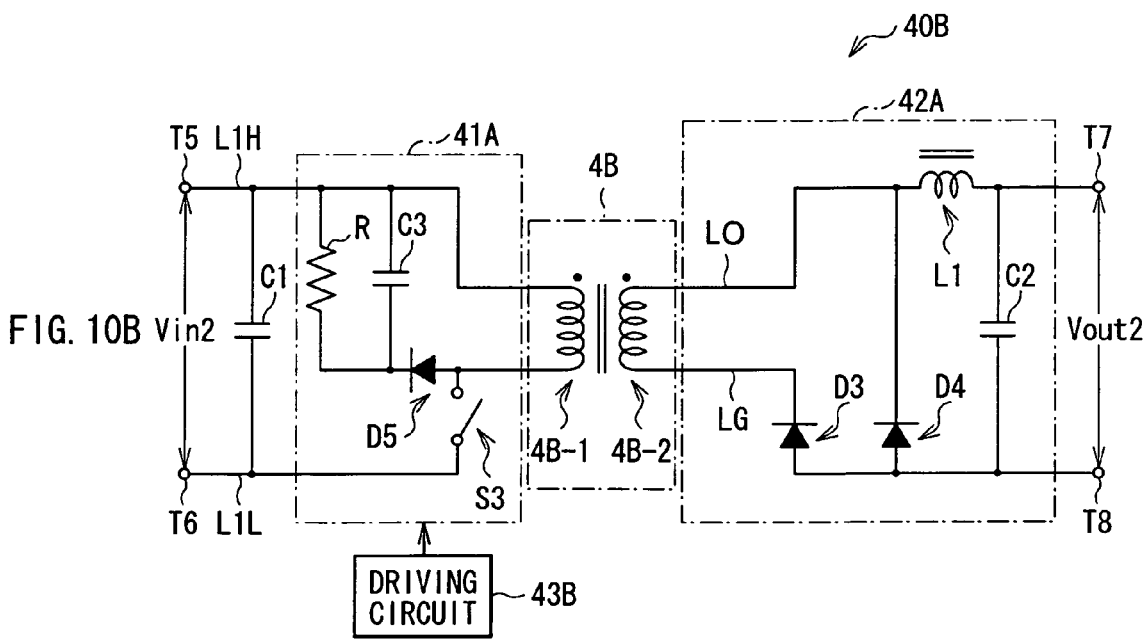

In the power supplies 40-1, 40-2 and 40-3, a power supply 40A exemplified in FIG. 10A and a power supply 40B exemplified in FIG. 10B are arranged in parallel, and a part of the power supply 40A and a part of the power supply 40B are combined to form a common part. Therefore, the power supplies 40A and 40B will be described separately, and then the power supplies 40-1, 40-2 and 40-3 will be described separately.

The power supplies 40A, 40B, 40-1, 40-2 and 40-3 function as DC-DC converters which convert a high input DC voltage Vin supplied from a high-tension battery (not shown) into a lower output DC voltage Vout to supply the voltage Vout to a low-tension battery (not shown), and are forward type power supplies as will be described later.

(Power Supply 40A)

The power supply 40A includes a magnetic element 4A, a switching circuit 41C and a smoothing capacitor C1 which are disposed on a primary side of the magnetic element 4A, a rectifying/smoothing circuit 42A which is disposed on a secondary side of the magnetic element 4A, and a driving circuit 43A which drives the switching circuit 41C. An input DC voltage Vin1 outputted from the high-tension battery is applied between an input terminal T1 of a primary high voltage line L1H and an input terminal T2 of a primary low voltage line L1L, and an output DC voltage Vout1 to be supplied to the low-tension battery is outputted between an output terminal T3 of an output line LO and an output terminal T4 of a ground line LG.

The magnetic element 4A is formed through winding a 1-input/1-output type transformer coil set including a primary winding 4A-1 with Na turns and a secondary winding 4A-2 with Nb turns around the magnetic core 10. The magnetic element 4A steps down an input AC voltage inputted from a switching circuit 41C to output an output AC voltage from the secondary winding 4A-2. The degree of stepping down in this case is determined by the turn ratio between the primary winding 4A-1 and the secondary winding 4A-2 (Nb/Na).

The switching circuit 41C is a single-phase inverter circuit which converts the input DC voltage Vin1 outputted from a high-tension battery into a single-phase AC voltage with a substantially rectangular waveform, and is a double forward type switching circuit formed through connecting two switching elements S1 and S2 driven by a switching signal (not shown) supplied from the driving circuit 43A to diodes D1 and D2. As the switching elements S1 and S2, for example, switching elements such as MOS-FETs (Metal Oxide Semiconductor-Field Effect Transistors) or IGBTs (Insulated Gate Bipolar Transistors) are used.

The switching element S1 is disposed between the primary high voltage line L1H and one end of the primary winding 4A-1, and the switching element S2 is disposed between the other end of the primary winding 4A-1 and the primary low voltage line L1L. A diode element D1 is disposed between the primary high voltage line L1H and the other end of the primary winding 4A-1 of the magnetic element 4A, and a diode element D2 is disposed between the one end of the primary winding 4A-1 and the primary low voltage line L1L.

In the switching circuit 41C, when the switching elements S1 and S2 are turned on, a current flows through a first current path from the primary high voltage line L1H to the primary low voltage line L1L via the switching element S1, the primary winding 4A-1 and the switching element S2 in order.

The rectifying/smoothing circuit 42A is a forward type rectifying/smoothing circuit including a pair of diodes D3 and D4, a choke coil L1 and a smoothing capacitor C2. The anode of the diode D3 is connected to one end of the secondary winding 4A-2, and the anode of the diode D4 is connected to the other end of the secondary winding 4A-2. The cathodes of the diodes D3 and D4 are connected to each other, and are connected to the ground line LG. The pair of diodes D3 and D4 obtain a DC voltage through separately rectifying each half wave period of the output AC voltage from the magnetic element 4A.

The choke coil L1 is inserted into the output line LO, and one end of the choke coil L1 is connected to a connecting point between the anode of the diode D4 and one end of the secondary winding 4A-2 of the magnetic element 4A, and the other end of the choke coil L1 is connected to the output terminal T3 of the outline LO. The smoothing capacitor C2 is connected between the output terminal T3 of the output line LO and the output terminal T4 of the ground line LG. The choke coil L1 and the smoothing capacitor C2 smooth a DC voltage rectified by the pair of diodes D3 and D4 to generate the output DC voltage Vout1, and the output DC voltage Vout1 is supplied from the output terminals T3 and T4 to the low-tension battery.

(Power Supply 40B)

The power supply 40B differs from the power supply 40A in including a magnetic element 4B instead of the magnetic element 4A, a switching circuit 41A instead of the switching circuit 41C, and a driving circuit 43B which drives the switching circuit 41A instead of the driving circuit 43A. Therefore, the magnetic element 4B and the switching circuit 41A will be described below.

The magnetic element 4B is formed through winding a 1-input/1-output type transformer coil set including a primary winding 4B-1 with Nc turns and a secondary winding 4B-2 with Nd turns around the magnetic core 10. The magnetic element 4B steps down an input AC voltage inputted from the switching circuit 41A to output an output AC voltage from the secondary winding 4B-2. The degree of stepping down in this case is determined by the turn ratio between the primary winding 4B-1 and the secondary winding 4B-2 (Nd/Nc).

The switching circuit 41A is a single-phase inverter circuit which converts an input DC voltage Vin2 outputted from the high-tension battery into a single-phase AC voltage with substantially rectangular waveform, and is a forward type switching circuit formed through arranging a circuit in which a resistor R and a capacitor C3 is arranged in parallel, the diode D3 and one switching element S3 which is driven by a switching signal (not shown) supplied from the driving circuit 43B in series.

The circuit in which the resistor R and the capacitor C3 are arranged in parallel is disposed between a connecting point between the primary high voltage line L1H and one end of the primary winding 4B-1 and the anode of the diode D5. The diode D5 is disposed between the circuit in which the resistor R and the capacitor C3 are arranged in parallel and a connecting point between the other end of the primary winding 4B-1 of the magnetic element 4B and the switching element S3. The switching element S3 is disposed between a connecting point between the cathode of the diode D5 and the other end of the primary winding 4B-1 of the magnetic element 4B and the primary low voltage line L1L.

In the switching circuit 41A, when the switching element S3 is turned on, a current flows through a current path from the primary high voltage line L1H to the primary low voltage line L1L via the primary winding 4B-1 and the switching element S3.

(Power Supply 40-1)

As described above, in the power supply 40-1, the power supply 40A and the power supply 40B are arranged in parallel, and a part of the power supply 40A and a part of the power supply 40B are combined to form a common part. More specifically, as shown in FIG. 11, the power supply 40-1 is a 1-input/1-output type power supply including the magnetic element 4, a switching circuit set 41-1, a rectifying/smoothing circuit set 42-1, and a driving circuit 43-1 which drives the switching circuit set 41-1.

The switching circuit set 41-1 is a combination of the switching circuit 41C of the power supply 40A and the switching circuit 41A of the power supply 40B. In the switching circuit set 41-1, the input terminals T1 and T2 and the smoothing capacitor C1 are shared between the switching circuit 41C and the switching circuit 41A, and the inputs of the switching circuit 41C and the switching circuit 41A are connected to the input terminal T1 and T2, and the output of the switching circuit 41C is connected to the primary winding 4A-2 (the input inner leg coil 21A), and the output of the switching circuit 41A is connected to the primary winding 4B-1 (the input outer leg coil 22A). Therefore, the switching circuit set 41-1 is a 1-input/2-output type switching circuit.

The rectifying/smoothing circuit set 42-1 is a combination of the rectifying/smoothing circuit 42A of the power supply 40A and the rectifying/smoothing circuit 42A of the power supply 40B. In the rectifying/smoothing circuit set 42-1, the output terminals T3 and T4, the choke coil L1, the smoothing capacitor C2 and the diode D4 are shared between the rectifying/smoothing circuits 42A of the power supplies 40A and 40B, and the input of the rectifying/smoothing circuit 42A of the power supply 40A is connected to the secondary winding 4A-2 (the output inner leg coil 21B), and the input of the rectifying/smoothing circuit 42A of the power supply 40B is connected to the secondary winding 4B-2 (the output outer leg coil 22B). On the other hand, the outputs of the rectifying/smoothing circuits 42A of the power supply 40A and the power supply 40B are connected to the output terminals T3 and T4. Therefore, the rectifying/smoothing circuit set 42-1 is a 2-input/1-output type rectifying/smoothing circuit.

The magnetic element 4 is a combination of the magnetic element 4A and the magnetic element 4B. In the magnetic element 4, the magnetic core 10 is shared between the magnetic elements 4A and 4B, and the primary winding 4A-1 (the input inner leg coil 21A) is connected to the output of the switching circuit 41C, and the primary winding 4B-1 (the input outer leg coil 22A) is connected to the output of the switching circuit 41A. On the other hand, the secondary winding 4A-2 (the output inner leg coil 21B) is connected to the input of the rectifying/smoothing circuit 42A of the power supply 40A, and the secondary winding 4B-2 (the output outer leg coil 22B) is connected to the input of the rectifying/smoothing circuit 42A of the power supply 40B. Therefore, the magnetic element 4 is a 2-input/2-output type transformer.

Moreover, a transformer coil set on an inner leg side (the inner leg coil 21) includes the primary winding 4A-1 (the input inner leg coil 21A) and the secondary winding 4A-2 (the output inner leg coil 21B), and the primary winding 4A-1 and the secondary winding 4A-2 are wound around the inner leg portion 10A of the magnetic core 10. On the other hand, a transformer coil set on an outer side (the outer leg coil 22) includes the primary winding 4B-1 (the input outer leg coil 22A) and the secondary winding 4B-2 (the output outer leg coil 22B), and the primary winding 4B-1 and the secondary winding 4B-2 are wound continuously from the first outer leg portion 10B-1 of the magnetic core 10 to the second outer leg portion 10B-2 of the magnetic core 10.

More specifically, the primary winding 4B-1 includes a first outer leg coil portion 4B-11 and a second outer leg coil portion 4B-12, and the outer leg coil portion 4B-11 is wound around the first outer leg portion 10B-1 of the first loop magnetic path 10C-1, and the outer leg coil portion 4B-12 is wound around the second outer leg portion 10B-2 of the second loop magnetic path 10C-2. At this time, the winding directions of the outer leg coil portion 4B-11 and the outer leg coil portion 4B-12 are in the same polarity direction, and the numbers of turns in the outer leg coil portion 4B-11 and the outer leg coil portion 4B-12 are equal to each other. In this case, the same polarity direction means that the directions of magnetic fluxes generated in the first outer leg portion 10B-1 and the second outer leg portion 10B-2 by a current flowing through the outer leg coil portion 4B-11 and the outer leg coil portion 4B-12 are the same.

In addition, combined physical characteristics of the first outer leg coil portion 4B-11 and the first outer leg portion 10B-1 around which the first outer leg coil portion 4B-11 is wound and combined physical characteristics of the second outer leg coil portion 4B-12 and the second outer leg portion 10B-2 around which the second outer leg coil portion 4B-12 is wound are the same in a relationship with the transformer coil set on the inner leg side.

The secondary winding 4B-2 includes a first outer leg coil portion 4B-21 and a second outer leg coil portion 4B-22, and the outer leg coil portion 4B-21 is wound around the fist outer leg portion 10B-1 of the first loop magnetic path 10C-1, and the outer leg coil portion 4B-22 is wound around the second outer leg portion 10B-2 of the second loop magnetic path 10C-2. At this time, the winding directions of the outer leg coil portion 4B-21 and the outer leg coil portion 4B-22 are in the same polarity direction, and the numbers of turns in the outer leg coil portion 4B-21 and the outer leg coil portion 4B-22 are equal to each other. In this case, the same polarity direction means that the directions of magnetic fluxes generated in the first outer leg portion 10B-1 and the second outer leg portion 10B-2 by a current flowing through the outer leg coil portion 4B-21 and the outer leg coil portion 4B-22 are the same.

Thereby, the magnetic fluxes generated in the first outer leg portion 10B-1 and the second outer leg portion 10B-2 by a current flowing through the transformer coil set on the outer leg side cancel each other out in the inner leg portion 10A, so a voltage is not substantially induced from the transformer coil set on the outer leg side to the transformer coil set on the inner leg side. On the other hand, magnetic fluxes generated in a loop magnetic path including the first leg portion 10B-1 and a loop magnetic path including the second outer leg portion 10B-2 by a current flowing through the transformer coil set on the inner leg side cancel each other out in the loop magnetic paths, so a voltage is not substantially induced from the transformer coil set on the inner leg side to the transformer coil set on the outer leg side.

Thereby, in spite of the fact that the transformer coil set on the inner leg side and the transformer coil set on the outer leg side are wound around the common magnetic core 10, there is no possibility that they interact with each other.

Thus, in the power supply 40-1 according to the application example, in spite of the fact that the transformer coil set on the inner leg side and the transformer coil set on the outer leg side are wound around the common magnetic core 10, they do not interact with each other, so two independent input/output operations can be performed through the use of the transformer coil set on the inner leg side and the transformer coil set on the outer leg side.

Thereby, two magnetic cores 10 which are necessary corresponding to the number of inputs/outputs when performing two independent input/output operations in related arts can be combined into one, so as a result, the number of magnetic cores 10 and a space occupied by the magnetic cores 10 can be reduced.

Moreover, as described above, in addition to the magnetic core 10, the smoothing capacitors C1 and C2, the choke coil L1, the diode D4, the input terminals T1 and T2 and the output terminals T3 and T4 can be combined, so the number of these parts can be reduced, and a space occupied by these parts can be reduced, and as a result, compared to the case where a plurality of independent power supplies 40A and 40B are arranged, an increase in the number of parts or an area occupied by the parts can be prevented.

Further, in the case where the turn ratio in the transformer coil set on the inner leg side (Nb/Na) is larger than the turn ratio in the transformer coil set in the outer leg side (Nb/Nc), when an input DC/AC voltage (or the input DC voltage Vin1) is reduced to be much lower than a usually used voltage, an output AC voltage (or the output DC voltage Vout1) can be outputted from the magnetic element 4 at a decreasing rate which is lower than that of an input AC voltage (or the input DC voltage Vin1) inputted into the magnetic element 4 or a decreasing rate of zero through converting from the transformer coil set on the inner leg side in which the turn ratio is relatively small to the transformer coil set on the outer leg side in which the turn ratio is relatively large.

For example, in the case where the turn ratio (Nb/Na) is $\frac{1}{5}$, and the turn ratio (Nd/Nc) is $\frac{1}{2}$, the magnitude of the input DC voltage Vin1 inputted into the power supply 40-1 under normal conditions is 200 V, and the magnitude of the input DC voltage Vin1 under abnormal conditions is 80 V, when the transformer coil set on the inner leg side is used under normal conditions, the output DC voltage Vin1 outputted from the power supply 40-1 is 40 V (=200V×$\frac{1}{5}$); however, when the transformer coil set on the inner leg side is used under abnormal conditions, the output DC voltage Vout1 is reduced to 16 V (=80V×$\frac{1}{5}$), and it is difficult to charge 40 V to the low-tension battery. Therefore, when the transformer coil set on the outer leg side is used under abnormal conditions instead of the transformer coil set on the inner leg side, the output DC voltage Vout1 can keep 40 V (=80V×$\frac{1}{2}$). Thereby, the low-tension battery can be charged to a predetermined voltage.

Moreover, as described above, in addition to alternately using the transformer coil set on the inner leg side and the transformer coil set on the outer leg side under normal conditions and abnormal conditions, the transformer coil set on the inner leg side and the transformer coil set on the outer leg side can be used at the same time.

For example, in the above-described example, in an abnormal state in which the input DC voltage Vin1 gradually decreased from 200 V, in the case where the duty ratio of a switching signal inputted into the switching elements S1 and S2 is increased, thereby the output DC voltage Vout1 is outputted without decreasing the input DC voltage Vin1, when the input DC voltage Vin1 is decreased to a predetermined range, the duty ratio of the switching signal inputted into the switching element S5 is adjusted so that the magnitude of the output DC voltage Vout1 outputted via the transformer coil set on the inner leg side becomes equal to the magnitude of the output DC voltage Vout1 outputted via the transformer coil set on the outer leg side, and the output DC voltages Vout1 and Vout2 are outputted via the transformer coil sets on the inner leg side and the outer leg side. In the case where the input DC voltage Vin1 is further decreased, the output from the transformer coil set on the inner side is suspended, and only the transformer coil set on the outer leg side is used to output the output DC voltage Vout2. Thereby, compared to the case where only the transformer coil set on the inner leg side is used, the range of the input DC voltage Vin1 which can maintain the magnitude of the output DC voltage can be expanded.

(Power Supply 40-2)

In the power supply 40-2, as in the case of the power supply 40-1, the power supply 40A and the power supply 40B are arranged in parallel, and a part of the power supply 40A and a part of the power supply 40B are combined to form a common part; however, compared to the power supply 40-1, as shown in FIG. 12, the rectifying/smoothing circuit 42A of the power supply 40A and the rectifying/smoothing circuit 42A of the power supply 40B are not combined and separately included, and separate output terminals T3, T4, T7 and T8 are included. Thus, the power supply 40-2 is a 1-input/2-output type power supply.

Thereby, the power supply 40-2 according to the application example has the same functions and the same effects as those of the power supply 40-1, except that the power supply 40-2 does not have the effect of reducing the number of parts or a space occupied by parts by sharing the rectifying/smoothing circuit 42A and the output terminals T3 and T4, and the power supply 40-2 has the following effect, because the power supply 40-2 includes the separate output terminals T3, T4, T7 and T8.

For example, in the case where the turn ratio in the transformer coil set on the inner leg side (Nb/Na) and the turn ratio in the transformer coil set on the outer leg side (Nd/Nc) are different from each other, the output DC voltage Vout1 with a different magnitude from that of the output DC voltage Vout2 or the output DC voltage Vout2 with a different magnitude from that of the output DC voltage Vout1 can be outputted from the output terminals T3 and T4 or the output terminals T7 and T8 by the input of one input DC voltage Vin1.

(Power Supply 40-3)

In the power supply 40-3, as in the case of the power supply 40-1, the power supply 40A and the power supply 40B are arranged in parallel, and a part of the power supply 40A and a part of the power supply 40B are combined to form a common part; however, compared to the power supply 40-1, as shown in FIG. 13, the positional relationship between the switching circuit 41A and the rectifying/smoothing circuit 42A of the power supply 40B are opposite, that is, the directions of input/output of the power supply 40A and the directions of input/output of the power supply 40B are different from each other.

Thus, the power supply 40-3 according to the application example is a 1-input/1-output type power supply in which the positional relationship between the switching circuit 41A and the rectifying/smoothing circuit 42A of the power supply 40B is opposite, so the power supply 40-3 has the following functions and effects.

For example, in the case where the turn ratio in the transformer coil set on the inner leg side (Nb/Na) is the same as the turn ratio in the transformer coil set on the outer leg side (Nd/Nc), when the input DC voltage (or the input DC voltage Vin1) is reduced more largely than a normally used voltage, power charged to the low-tension battery can be supplied to the high-tension battery through switching from the transformer coil set on the inner leg side to the transformer coil set on the outer leg side.

For example, in the case where the turn ratio (Nb/Na) is ⅕, the turn ratio (Nd/Nc) is ⅕, and the magnitude of the input DC voltage Vin1 under normal conditions is 200 V, and the magnitude of the input DC voltage Vin1 under abnormal conditions is 80 V, when the transformer coil set on the inner leg side is used under normal conditions, the output DC voltage Vout1 is 40 V (200V×⅕); however, when the transformer coil set on the inner leg side is used under abnormal conditions, the output DC voltage Vout1 is reduced to 16 V (=80V×⅕), so the high-tension battery does not function as a high-tension battery. Therefore, the transformer coil set on the outer leg side instead of the transformer coil set on the inner leg side is used under abnormal conditions to output the input DC voltage Vin2 charged to the low-tension battery between the output terminals T3 and T4, and then to output the output DC voltage Vout2 (=200V=40V×5) between the input terminals T1 and T2 to which the high-tension battery is connected. Thereby, the high-tension battery can be charged to a predetermined voltage, and the function of the high-tension battery can be recovered.

SECOND APPLICATION EXAMPLE

Figure 15:
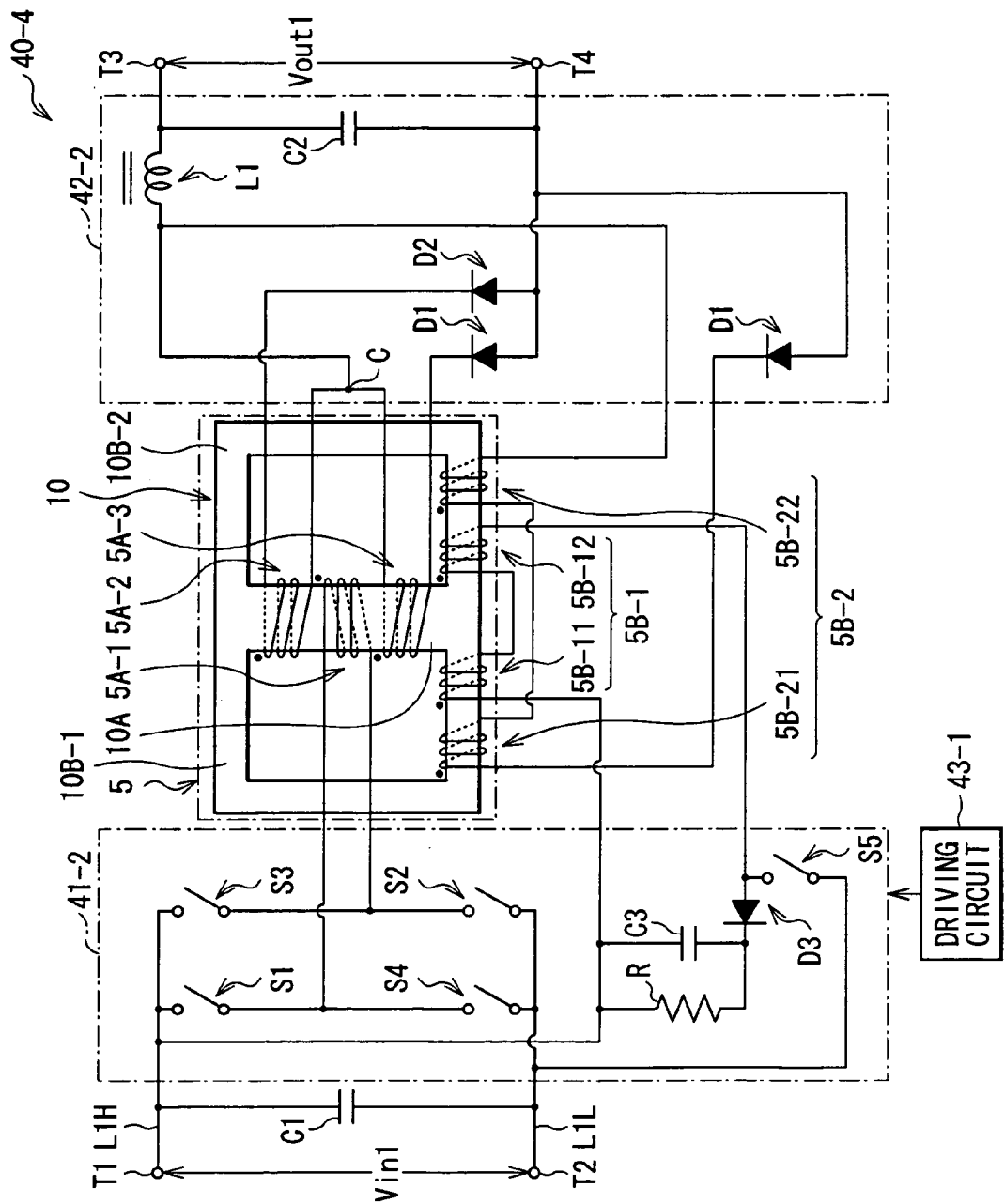
FIG. 15 is a circuit diagram of a power supply according to an application example of the magnetic element shown in FIG. 5.
Figure 16:
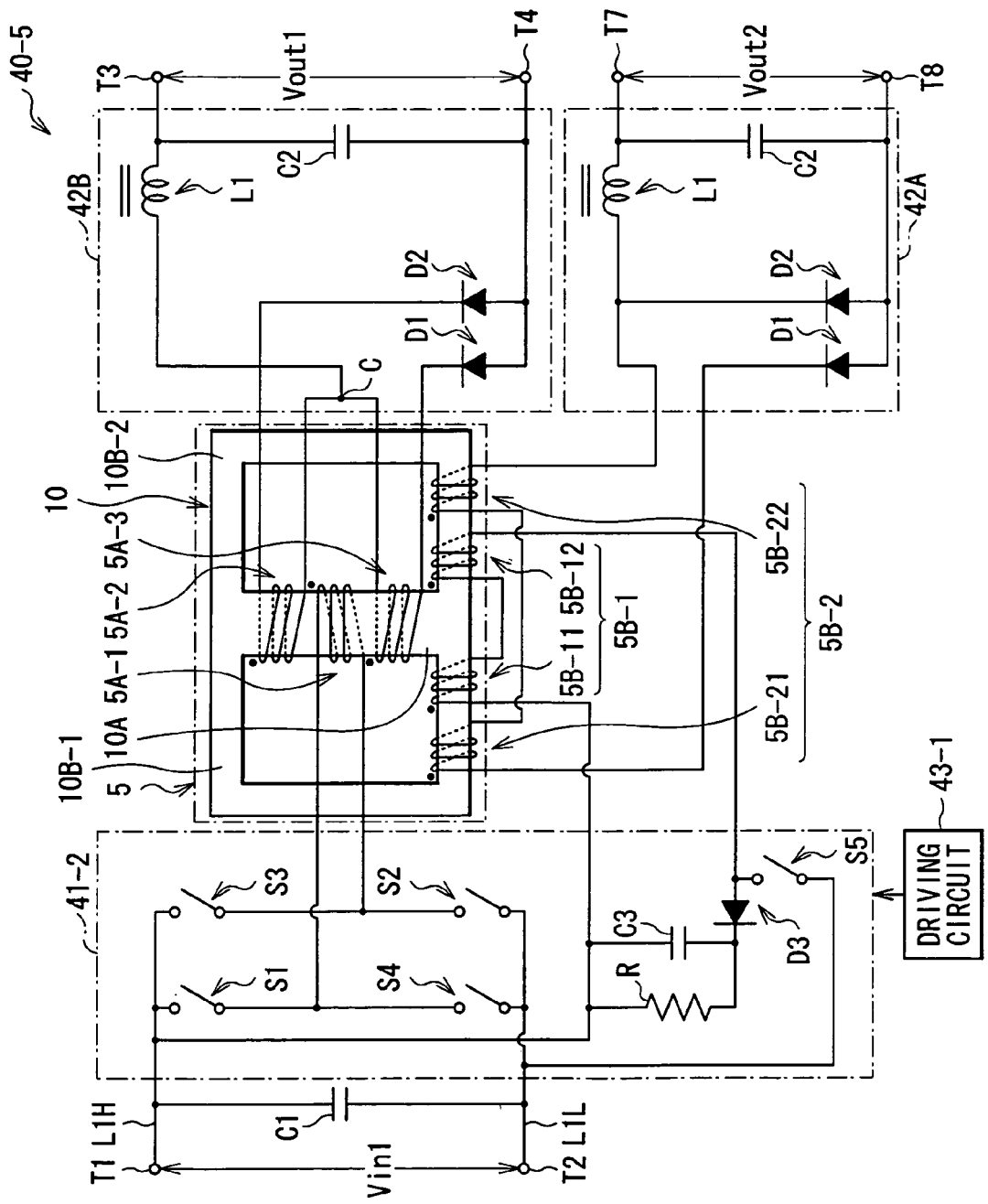
FIG. 16 is a circuit diagram of another power supply according to the application example of the magnetic element shown in FIG. 5.
Figure 17:
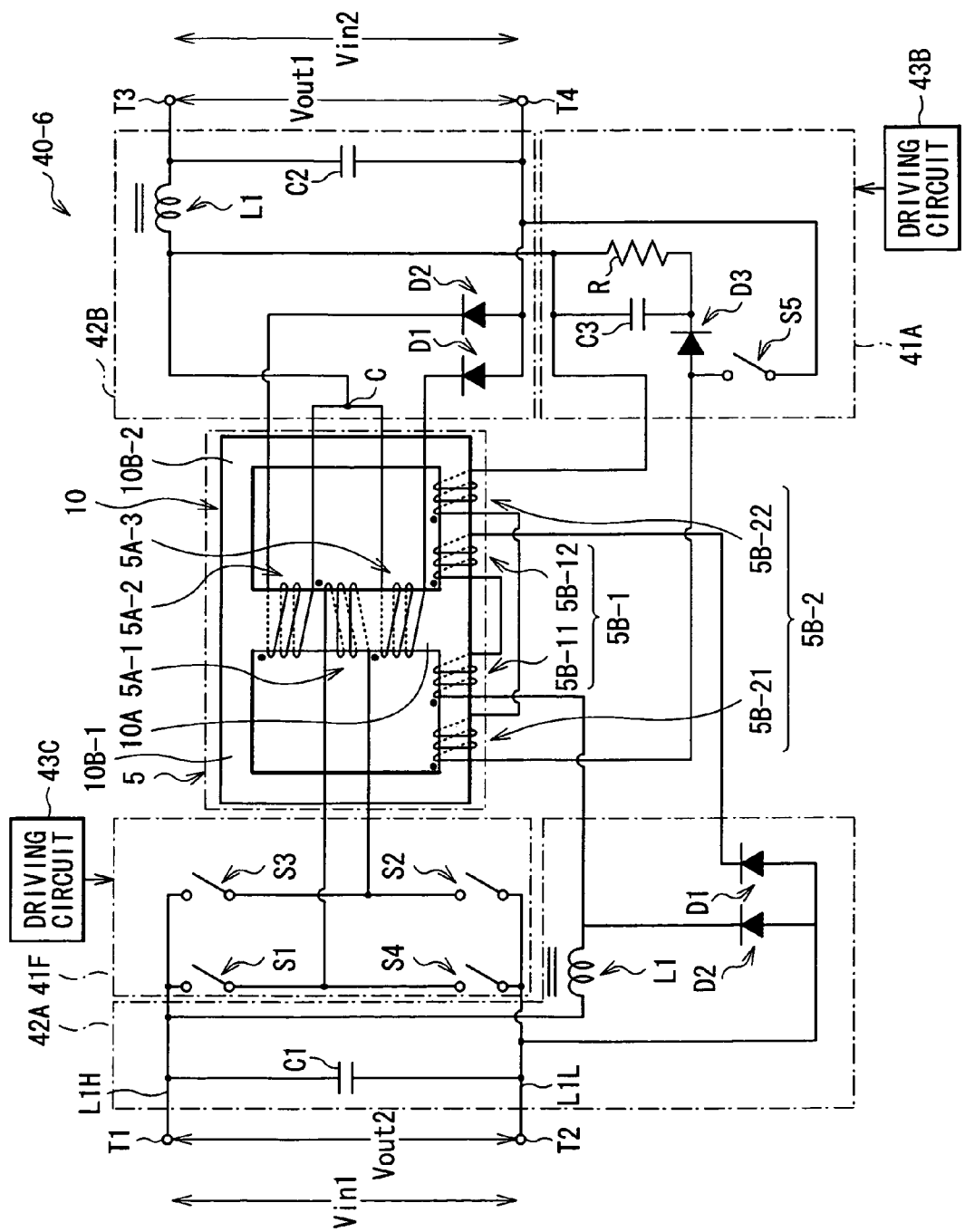
FIG. 17 is a circuit diagram of still another power supply according to the application example of the magnetic element shown in FIG. 5.

FIGS. 15 through 17 show schematic structures of power supplies 40-4 through 40-6 using the magnetic element 5 (2-input/3-output type) according to the fourth modification.

Figure 14A:
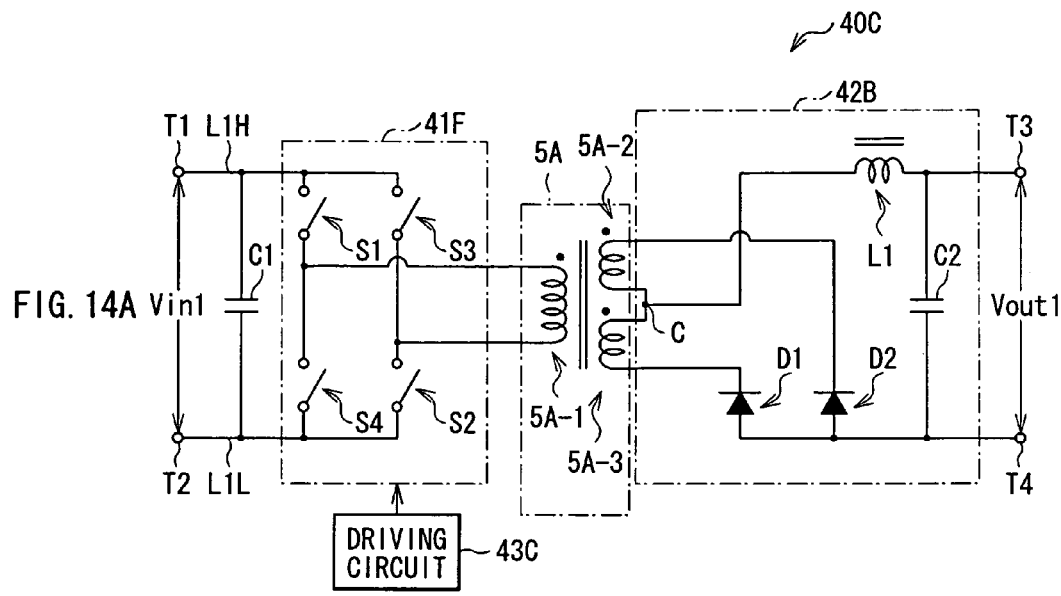
FIGS. 14A and 14B are circuit diagrams for describing a power supply according to an application example of the magnetic element shown in FIG. 5.
Figure 14B:
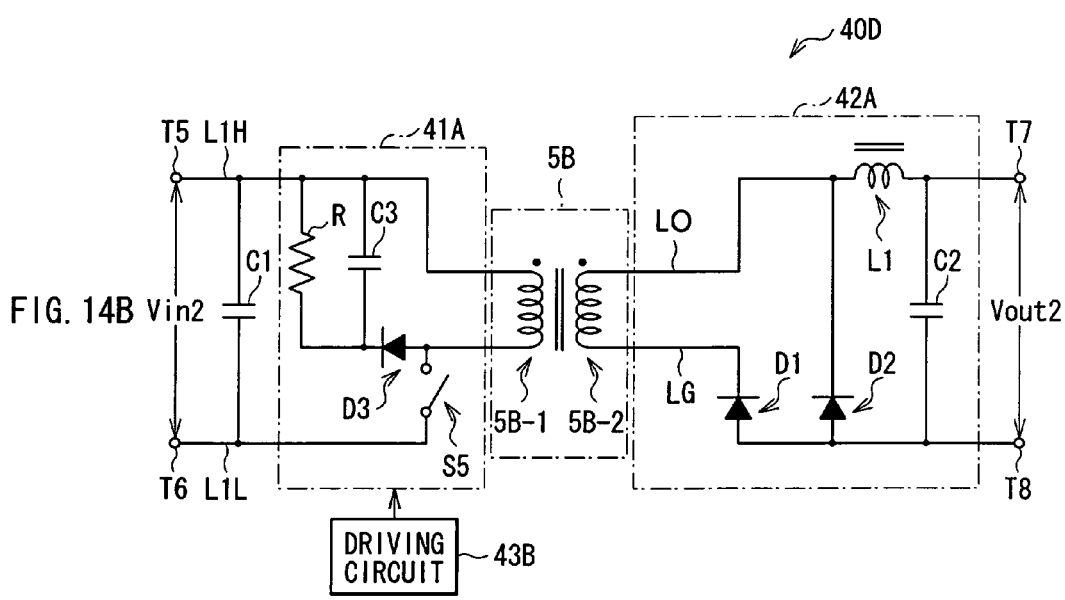

In the power supplies 40-4, 40-5 and 40-6, the power supply 40C exemplified in FIG. 14A and the power supply 40D exemplified in FIG. 14B are arranged in parallel, and a part of the power supply 40C and a part of the power supply 40D are combined to form a common part. Therefore, after the power supply 40C is described, the power supply 40-4, 40-5 and 40-6 will be described separately. The power supply 40D has substantially the same structure as that of the power supply 40B, so the power supply 40D will not be described.

The power supplies 40C, 40D, 40-4, 40-5 and 40-6 function as DC-DC converters which convert a high input DC voltage Vin supplied from a high-tension battery (not shown) into a lower output DC voltage Vout to supply the voltage Vout to a low-tension battery, and the power supply 40C is a center tap type power supply as will be described later, and the power supply 40D is a forward type power supply as will be described later.

(Power Supply 40C)

The power supply 40C includes a magnetic element 5A, a switching circuit 41F and a smoothing capacitor C1 which are disposed on a primary side of the magnetic element 5A, a rectifying-smoothing circuit 42B which is disposed on a secondary side of the magnetic element 5A, and a driving circuit 43C which drives the switching circuit 41F.

The magnetic element 5A is formed through winding a 1-input/2-output type transformer coil set including a primary winding 5A-1 with Na turns, a secondary winding 5A-2 with Nb turns and a secondary winding 5A-3 with Nb turns around a magnetic core 10. The magnetic element 5A steps down an input AC voltage inputted from the switching circuit 41F to output an output AC voltage from the secondary windings 5A-2 and 5A-3. The degree of stepping down in this case is determined by the turn ratio between the primary winding 5A-1 and the secondary winding 5A-2 (Nb/Na).

The switching circuit 41F is a single-phase inverter circuit which converts the input DC voltage Vin1 outputted from a high-tension battery into a single-phase AC voltage with a substantially rectangular waveform, and a full bridge type switching circuit formed through full-bridging four switching elements S1, S2, S3 and S4 which are driven by a switching signal (not shown) supplied from the driving circuit 43C. As the switching elements S1 through S4, for example, switching elements such as MOS-FETs (Metal Oxide Semiconductor-Field Effect Transistors) or IGBTs (Insulated Gate Bipolor Transistors) are used.

The switching element S1 is disposed between the primary high voltage line L1H and one end of the primary winding 5A-1 of the magnetic element 5A, and the switching element S2 is disposed between the other end of the primary winding 5A-1 and the primary low voltage line L1L. The switching element S3 is disposed between the primary high voltage line L1H and the other end of the primary winding 5A-1, and the switching element S4 is disposed between the one end of the primary winding 5A-1 and the primary low voltage line L1L.

In the switching circuit 41F, when the switching element S1 and S2 are turned on, a current flows through a first current path from the primary high voltage line L1H to the primary low line L1L via the switching element S1, the primary winding 5A-1 and the switching element S2, and when the switching elements S3 and S4 are turned on, a current flows through a second current path from the primary high voltage line L1H to the primary low voltage line L1L via the switching element S3, the primary winding 5A-1 and the switching element S4.

The rectifying/smoothing circuit 42B is a center tap type rectifying/smoothing circuit including a pair of diodes D1 and D2, the choke coil L1 and the smoothing capacitor C2. The anode of the diode D1 is connected to one end of the secondary winding 5A-3, and the anode of the diode D2 is connected to one end of the secondary winding 5A-2. The other end of the secondary winding 5A-2 and the other end of the secondary winding 5A-3 are connected to the output line LO. Hereinafter a connecting point between the other ends of the secondary windings 5A-2 and 5A-3 and the output line LO is referred to as a connecting point C. The cathodes of the diodes D1 and D2 are connected to each other, and they are connected to the ground line LG. The pair of diodes D1 and D2 obtain a DC voltage through separately rectifying each half wave period of the output AC voltage from the magnetic element 5A.

The choke coil L1 is inserted into the output line LO, and one end of the choke coil L1 is connected to the connecting point C, and the other end of the choke coil L1 is connected to the output terminal T3 of the output line LO. The smoothing capacitor C2 is connected between the output terminal T3 of the output line LO and the output terminal T4 of the ground line LG. The choke coil L1 and the smoothing capacitor C2 smooth a DC voltage rectified by the pair of diodes D1 and D2 to generate the output DC voltage Vout1, and the output DC voltage Vout1 is supplied from the output terminals T3 and T4 to the low-tension battery.

(Power Supply 40-4)

As described above, in the power supply 40-4, the power supply 40C and the power supply 40D are arranged in parallel, and a part of the power supply 40C and a part of the power supply 40D are combined to form a common part. More specifically, as shown in FIG. 15, the power supply 40-4 is a 1-input/1-output type power supply including the magnetic element 5, a switching circuit set 41-2, a rectifying/smoothing circuit set 42-2 and a driving circuit 43-1.

The switching circuit set 41-2 is a combination of the switching circuit 41F of the power supply 40C and the switching circuit 41A of the power supply 40D. In the switching circuit set 41-2, the input terminals T1 and T2 and the smoothing capacitor C1 are shared between the switching circuit 41F and the switching circuit 41A, and the inputs of the switching circuit 41F and the switching circuit 41A are connected to the input terminals T1 and T2. The output of the switching circuit 41F is connected to the primary winding 5A-1 (the input inner leg coil 31A), and the output of the switching circuit 41A is connected to the primary winding 5B-1 (the input outer leg coil 22A). Therefore, the switching circuit set 41-2 is a 1-input/2-out type switching circuit.

The rectifying/smoothing circuit set 42-2 is a combination of the rectifying/smoothing circuit 42B and the rectifying/smoothing circuit 42A. In the rectifying/smoothing circuit set 42-2, the output terminals T3 and T4, the choke coil L1 and the smoothing capacitor C2 are shared between the rectifying/smoothing circuits 42B and 42A, and the input of the rectifying/smoothing circuit 42B is connected to the secondary winding 5A-2 (the output inner leg coil 31B) and the secondary winding 5A-3 (the output inner leg coil 31C), and the input of the rectifying/smoothing circuit 42A is connected to the secondary winding 5B-2 (the output outer leg coil 22B). On the other hand, the outputs of the rectifying/smoothing circuit 42B and the rectifying/smoothing circuit 42A are connected to the output terminals T3 and T4. Therefore, the rectifying/smoothing circuit set 42-2 is a 3-input/1-output type rectifying/smoothing circuit.

The magnetic element 5 is a combination of the magnetic element 5A and the magnetic element 5B. In the magnetic element 5, the magnetic core 10 is shared between the magnetic elements 5A and 5B, and the primary winding 5A-1 (the input inner leg coil 31A) is connected to the output of the switching circuit 41F, and the primary winding 5B-1 (the input outer leg coil 22A) is connected to the output of the switching circuit 41A. On the other hand, the secondary winding 5A-2 (the output inner leg coil 31B) and the secondary winding 5A-3 (the output inner leg coil 31C) are connected to the input of the rectifying/smoothing circuit 42B, and the secondary winding 5B-2 (the output outer leg coil 22B) is connected to the input of the rectifying/smoothing circuit 42A. Therefore, the magnetic element 5 is a 2-input/3-output type transformer.

Moreover, the transformer coil set on the inner leg side (the inner leg coil 31) includes the primary winding 5A-1 (the input inner leg coil 31A), the secondary winding 5A-2 (the output inner leg coil 31B) and the secondary winding 5A-3 (the output inner leg coil 31C), and the primary winding 5A-1, the secondary winding 5A-2 and the secondary winding 5A-3 are wound around the inner leg portion 10A of the magnetic core 10. On the other hand, the transformer coil set on the outer leg side (the outer leg coil 22) includes the primary winding 5B-1 (the input outer leg coil 22A) and the secondary winding 5B-2 (the output outer leg coil 22B), and the primary winding 5B-1 and the secondary winding 5B-2 are wound continuously from the first outer leg portion 10B-1 of the magnetic core 10 to the second outer leg portion 10B-2 of the magnetic core 10.

More specifically, the secondary winding 5A-2 and the secondary winding 5A-3 are wound around the inner leg portion 10A and connected in series so that the winding directions of the secondary windings 5A-2 and 5A-3 are in the same polarity direction, and the numbers of turns in the secondary windings 5A-2 and 5A-3 are the same. In this case, the same polarity direction means that the directions of magnetic fluxes generated in the inner leg portion 10A by a current flowing through the secondary winding 5A-2 and the secondary winding 5A-3 are the same. The primary winding 5B-1 and the secondary winding 5B-2 have the same structures as those of the primary winding 4B-1 and the secondary winding 4B-2 of the power supply 40-1, respectively.

Therefore, the power supply 40-4 according to the application example has the same functions and the same effects as those of the power supply 40-1.

(Power Supply 40-5)

In the power supply 40-5, as in the case of the power supply 40-4, the power supply 40C and the power supply 40D are arranged in parallel, and a part of the power supply 40C and a part of the power supply 40D are combined to form a common part; however, compared to the power supply 40-4, as shown in FIG. 16, as in the case of the power supply 40-2, the rectifying/smoothing circuit 42B of the power supply 40C and the rectifying/smoothing circuit 42A of the power supply 40D are not combined and separately included, and the separate output terminals T3, T4, T7 and T8 are included. Therefore, the power supply 40-4 has the same functions and the same effect as those of the power supply 40-2.

(Power Supply 40-6)

In the power supply 40-6, as in the case of the power supply 40-4, the power supply 40C and the power supply 40D are arranged in parallel, and a part of the power supply 40C and a part of the power supply 40D are combined to form a common part; however, compared to the power supply 40-4, as shown in FIG. 17, as in the case of the power supply 40-3, the positional relationship between switching circuit 41A and the rectifying/smoothing circuit 42A of the power supply 40D are opposite, that is, the directions of the input/output of the power supply 40C and the directions of the input/output of the power supply 40D are different from each other. Thus, the power supply 40-6 according to the application example is a 1-input/1-output type power supply in which the positional relationship between the switching circuit 41A and the rectifying/smoothing circuit 42A of the power supply 40D are opposite, so the power supply 40-6 has the same functions and the same effects as those of the power supply 40-3.

THIRD APPLICATION EXAMPLE

Figure 19:
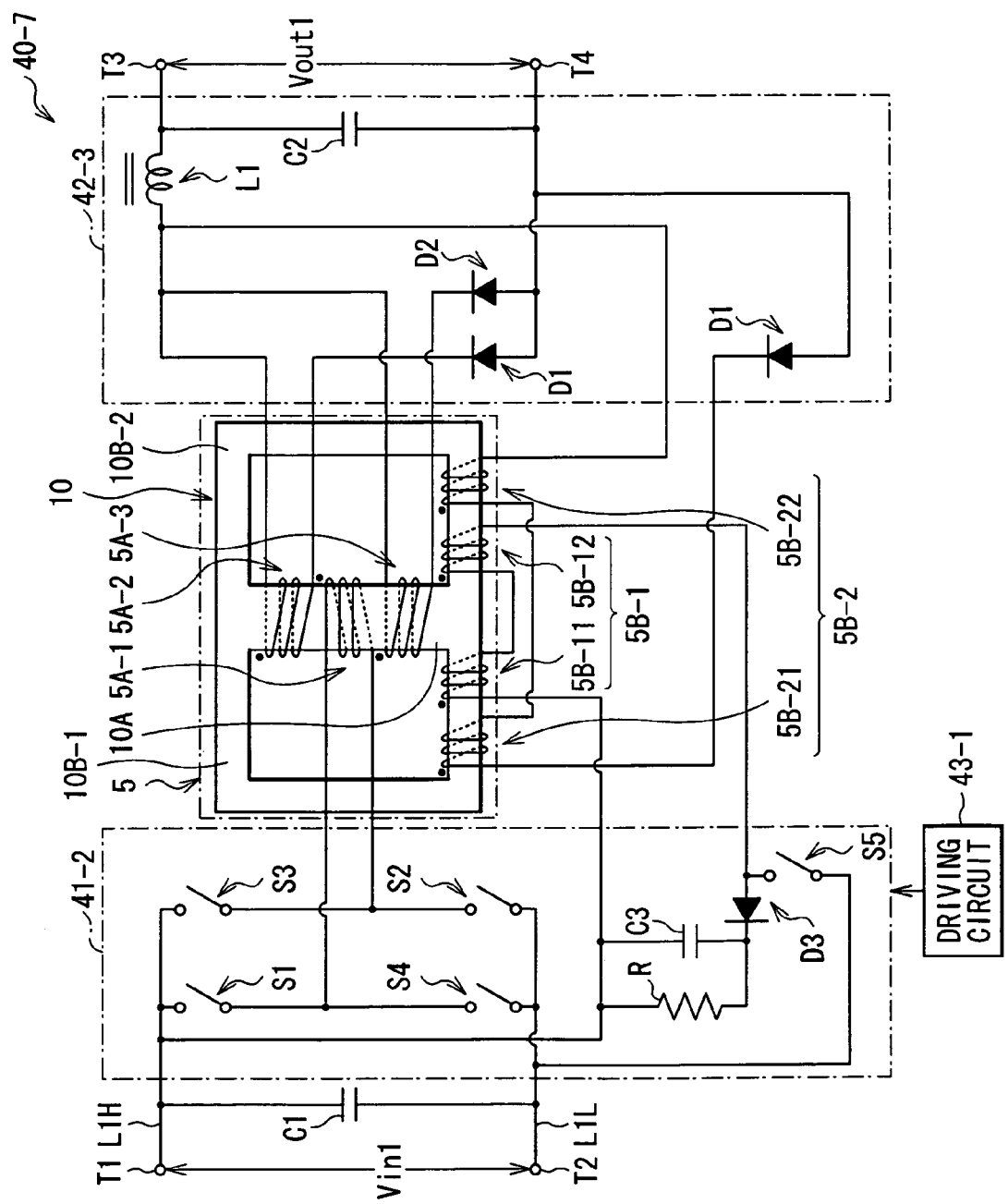
FIG. 19 is a circuit diagram of a power supply according to another application example of the magnetic element shown in FIG. 5.

FIG. 19 shows a schematic structure of a power supply 40-7 using the magnetic element 5 (2-input/3-output type) according to the fourth modification.

Figure 18:
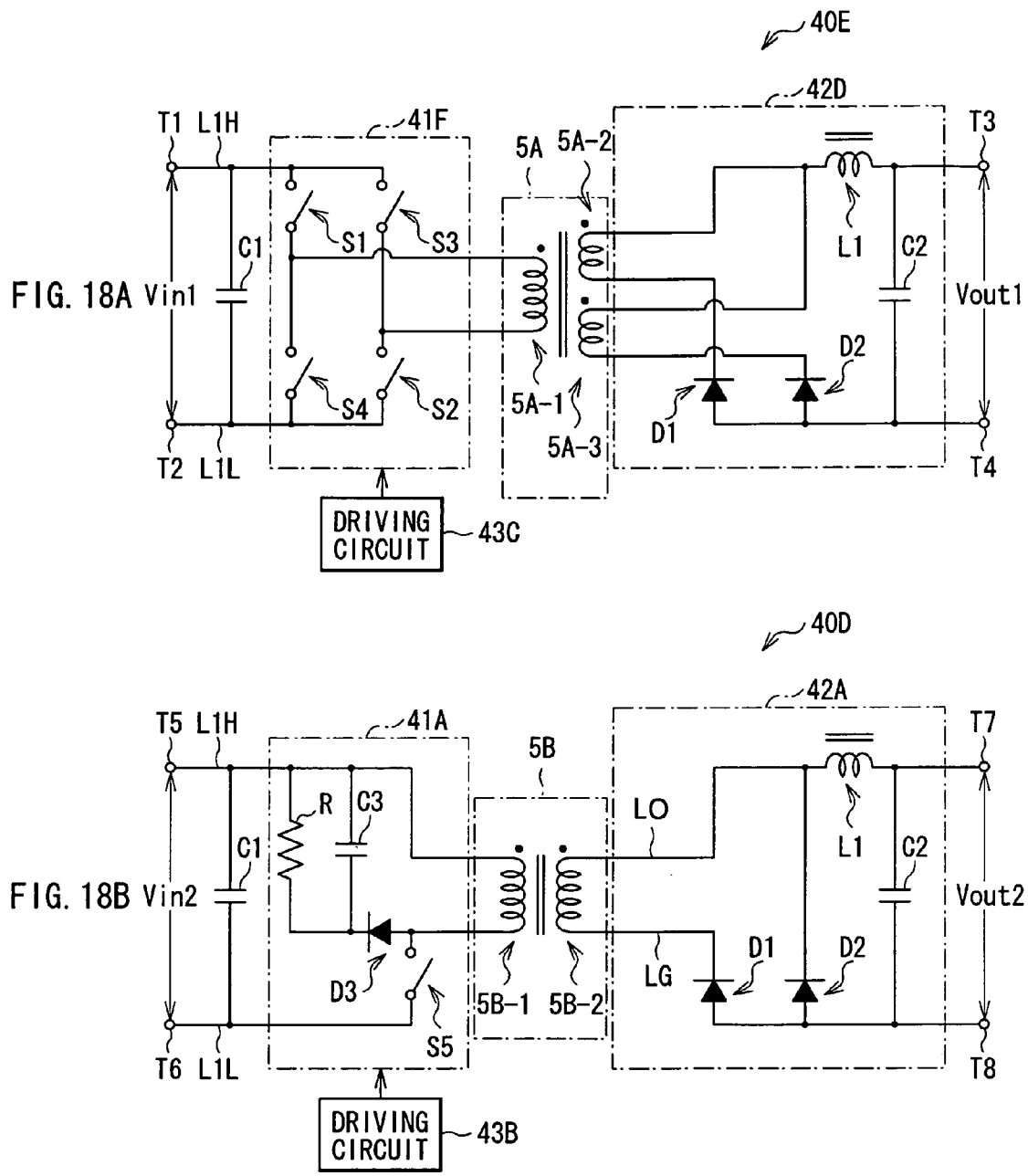
FIGS. 18A and 18B are circuit diagrams for describing a power supply according to another application example of the magnetic element shown in FIG. 5.

In the power supply 40-7, the power supply 40E exemplified in FIG. 18A and the power supply 40D exemplified in FIG. 18B are arranged in parallel, and a part of the power supply 40E and a part of the power supply 40D are combined to form a common part. The power supply 40D will not be further described because the power supply 40D has been already described above, and the power supply 40E and the power supply 40-7 will be described below.

(Power Supply 40E)

The power supply 40E includes the magnetic element 5A, the switching circuit 41F and the smoothing capacitor C1 which are disposed on a primary side of the magnetic element 5A, a rectifying/smoothing circuit 42D which is disposed on a secondary side of the magnetic element 5A and the driving circuit 43C. Therefore, the power supply 40E differs from the power supply 40C in including the rectifying/smoothing circuit 42D instead of the rectifying/smoothing circuit 42B. Therefore, the rectifying/smoothing circuit 42D will be described below.

The rectifying/smoothing circuit 42D is a push-pull type rectifying/smoothing circuit including a pair of diodes D1 and D2, the choke coil L1 and the smoothing capacitor C2. The anode of the diode D1 is connected to one end of the secondary winding 5A-2, and the anode of the diode D2 is connected to one end of the secondary winding 5A-3. The other end of the secondary winding 5A-2 and the other end of the secondary winding 5A-2 are connected to the output line LO. The cathodes of the diodes D1 and D2 are connected to each other, and are connected to the ground line LG. The pair of diodes D1 and D2 obtain a DC voltage through separately rectifying each half wave period of the output AC voltage from the magnetic element 5A.

The choke coil L1 is inserted into the output line LO, and one end of the choke coil L1 is connected to the other end of the secondary winding 5A-2 and the other end of the secondary winding 5A-3, and the other end of the choke coil L1 is connected to the output terminal T3 of the output line LO. The smoothing capacitor C2 is connected between the output terminal T3 of the output line LO and the output terminal T4 of the ground line LG. The choke coil L1 and the smoothing capacitor C2 smooth a DC voltage rectified by the pair of diodes D1 and D2 to generate the output DC voltage Vout1, and the output DC voltage Vout1 is supplied from the output terminals T3 and T4 to the low-tension battery.

(Power Supply 40-7)

As described above, in the power supply 40-7, the power supply 40E and the power supply 40D are arranged in parallel, and a part of the power supply 40E and a part of the power supply 40D are combined to form a common part. More specifically, as shown in FIG. 19, the power supply 40-7 is a 1-input/1-output type power supply including the magnetic element 5, the switching circuit set 41-2, the rectifying/smoothing circuit set 42-3 and the driving circuit 43-1. The magnetic element 5, the switching circuit set 41-2 and the driving circuit 43-1 are the same as those of the power supply 40-4, and will not be further described.

The rectifying/smoothing circuit set 42-3 is a combination of the rectifying/smoothing circuit 42D and the rectifying/smoothing circuit 42A. In the rectifying/smoothing circuit set 42-3, the output terminals T3 and T4, the choke coil L1, and the smoothing capacitor C2 are shared between the rectifying/smoothing circuits 42D and 42A, and the input of the rectifying/smoothing circuit 42D is connected to the secondary winding 5A-2 (the output inner leg coil 31B) and the secondary winding 5A-3 (the output inner leg coil 31C), and the input of the rectifying/smoothing circuit 42A is connected to the secondary winding 5B-2 (the output outer leg coil 22B). On the other hand, the outputs of the rectifying/smoothing circuit 42D and the rectifying/smoothing circuit 42A are connected to the output terminals T3 and T4. Therefore, the rectifying/smoothing circuit set 42-3 is a 3-input/1-output type rectifying/smoothing circuit as in the case of the rectifying/smoothing circuit set 42-2 of the power supply 40-4.

Therefore, the power supply 40-7 according to the application example has the same functions and the same effects as those of the power supply 40-4.

FOURTH APPLICATION EXAMPLE

Figure 21:
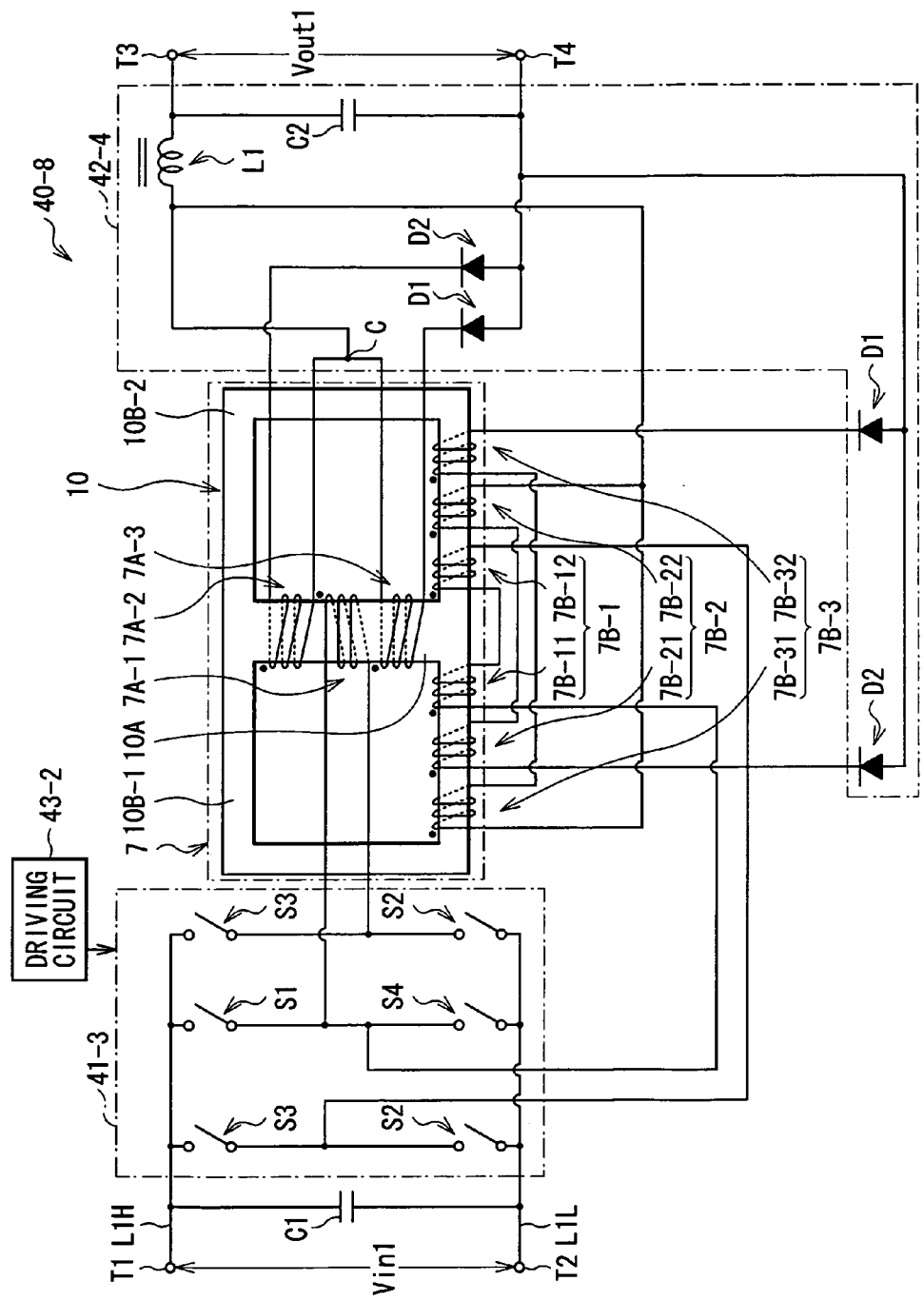
FIG. 21 is a circuit diagram of a power supply according to an application example of the magnetic element shown in FIG. 7.

FIG. 21 shows a schematic structure of a power supply 40-8 using the magnetic element 7 (2-input/4-output type) according to the sixth modification.

Figure 20A:
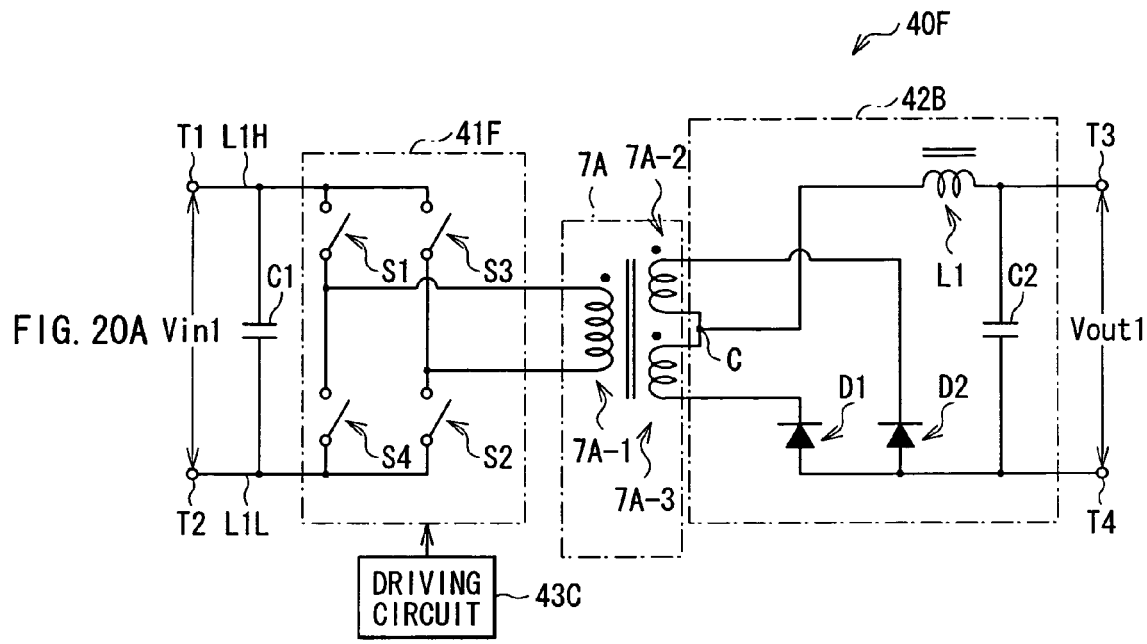
FIGS. 20A and 20B are circuit diagrams for describing a power supply according to an application example of the magnetic element shown in FIG. 7.
Figure 20B:
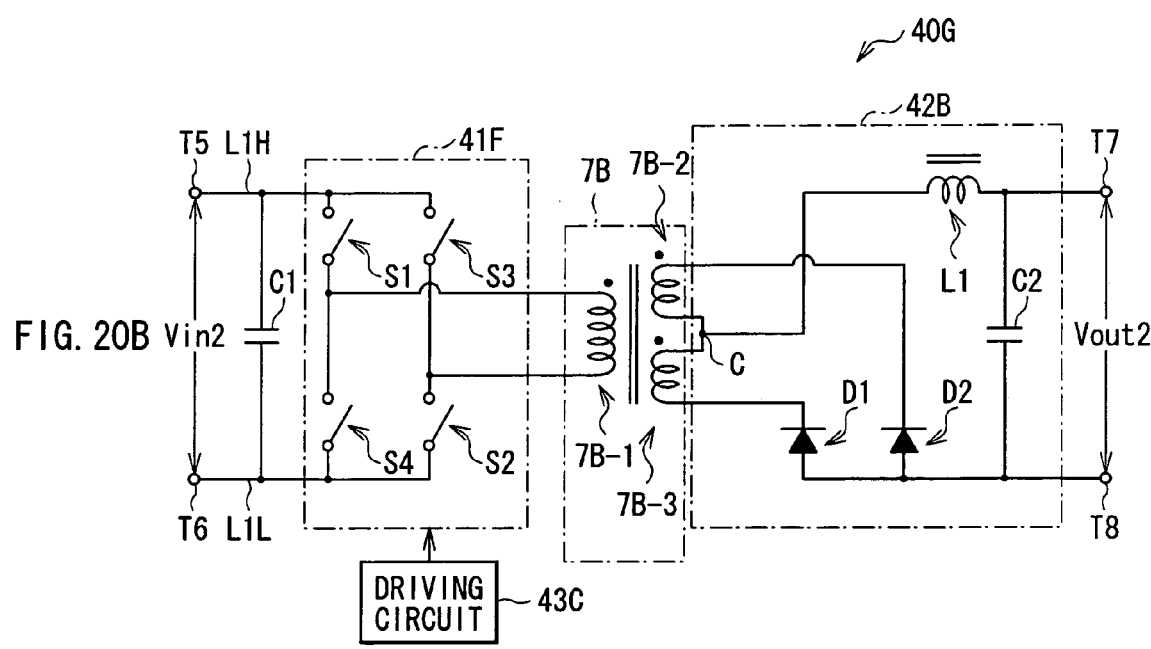

In the power supply 40-8, a power supply 40F exemplified in FIG. 20A and a power supply 40G exemplified in FIG. 20B are arranged in parallel, and a part of the power supply 40F and a part of the power supply 40G are combined to form a common part. The power supply 40F and the power supply 40G have substantially the same structure as the power supply 40C, so they will not be described, and the power supply 40-8 will be described below.

(Power Supply 40-8)

As described above, in the power supply 40-8, the power supply 40F and the power supply 40G are arranged in parallel, and a part of the power supply 40F and a part of the power supply 40G are combined to form a common part. More specifically, as shown in FIG. 21, the power supply 40-8 is a 1-input/1-output type power supply including the magnetic element 7, a switching circuit set 41-3, a rectifying/smoothing circuit set 42-4 and a driving circuit 43-2 which drives the switching circuit set 41-3.

The switching circuit set 41-3 is a combination of the switching circuit 41F of the power supply 40F and the switching circuit 41F of the power supply 40G. In the switching circuit set 41-2, the input terminals T1 and T2, the smoothing capacitor C1 and the switching elements S1 and S4 are share between the switching circuits 41F of the power supplies 40F and 40G, and the input of the switching circuit 41F of the power supply 40F and the input of the switching circuit 41F of the power supply 40G are connected to the input terminals T1 and T2. The output of the switching circuit 41F of the power supply 40F is connected to the primary winding 7A-1 (the input inner leg coil 31A), and the output of the switching circuit 41F of the power supply 40G is connected to the primary winding 7B-1 (the input outer leg coil 32A). Therefore, the switching circuit set 41-3 is a 1-input/2-output type switching circuit.

The rectifying/smoothing circuit set 42-4 is a combination of the rectifying/smoothing circuit 42B of the power supply 40F and the rectifying/smoothing circuit 42B of the power supply 40G. In the rectifying/smoothing circuit set 42-4, the output terminals T3 and T4, the choke coil L1 and the smoothing capacitor C2 are shared between the rectifying/smoothing circuits 42B of the power supplies 40F and 40G, and the input of the rectifying/smoothing circuit 42B of the power supply 40F is connected to the secondary winding 7A-2 (the output inner leg coil 31B) and the secondary winding 7A-3 (the output inner leg coil 31C), and the input of the rectifying/smoothing circuit 42B of the power supply 40G is connected to the secondary winding 7B-2 (the output outer leg coil 32B) and the secondary winding 7B-3 (the output outer leg coil 32C). On the other hand, the outputs of the rectifying/smoothing circuits 42B of the power supply 40F and the power supply 40G are connected to the output terminals T3 and T4. Therefore, the rectifying/smoothing circuit set 42-4 is a 4-input/1-output type rectifying/smoothing circuit.

The magnetic element 7 is a combination of the magnetic element 7A and the magnetic element 7B. In the magnetic element 7, the magnetic core 10 is shared, and the primary winding 7A-1 (the input inner leg coil 31A) is connected to the output of the switching circuit 41F of the power supply 40F, and the primary winding 7B-1 (the input outer leg coil 32A) is connected to the output of the switching circuit 41F of the power supply 40G. On the other hand, the secondary winding 7A-2 (the output inner leg coil 31B) and the secondary winding 7A-3 (the output inner leg coil 31C) are connected to the input of the rectifying/smoothing circuit 42B of the power supply 40F, and secondary winding 7B-2 (the output outer leg coil 32B) and the secondary winding 7B-3 (the output outer leg coil 32C) are connected to the input of the rectifying/smoothing circuit 42B of the power supply 40F. Therefore, the magnetic element 7 is a 2-input/4-output type transformer.

Moreover, the transformer coil set on the inner leg side (the inner leg coil 31) includes the primary winding 7A-1 (the input inner leg coil 31A), the secondary winding 7A-2 (the output inner leg coil 31B) and the secondary winding 7A-3 (the output inner leg coil 31C), and is wound around the inner leg portion 10A of the magnetic core 10. On the other hand, the transformer coil set on the outer leg side (the outer leg coil 32) includes the primary winding 7B-1 (the input outer leg coil 32A), the secondary winding 7B-2 (the output outer leg coil 32B) and the secondary winding 7B-3 (the output outer leg coil 32C), and is wound continuously from the first outer leg portion 10B-1 of the magnetic core 10 to the second outer leg portion 10B-2 of the magnetic core 10.

More specifically, the secondary winding 7A-2 and the secondary winding 7A-3 have the same structures as those of the secondary winding 5A-2 and the secondary winding 5A-3 of the power supply 40-4, respectively, and the primary winding 7B-1 and the secondary winding 7B-2 have the same structures as those of the primary winding 4B-1 and the secondary winding 4B-2 of the power supply 40-1, respectively. Therefore, the power supply 40-8 according to the application example has the same functions and the same effects as those of the power supply 40-1.

FIFTH APPLICATION EXAMPLE

Figure 22:
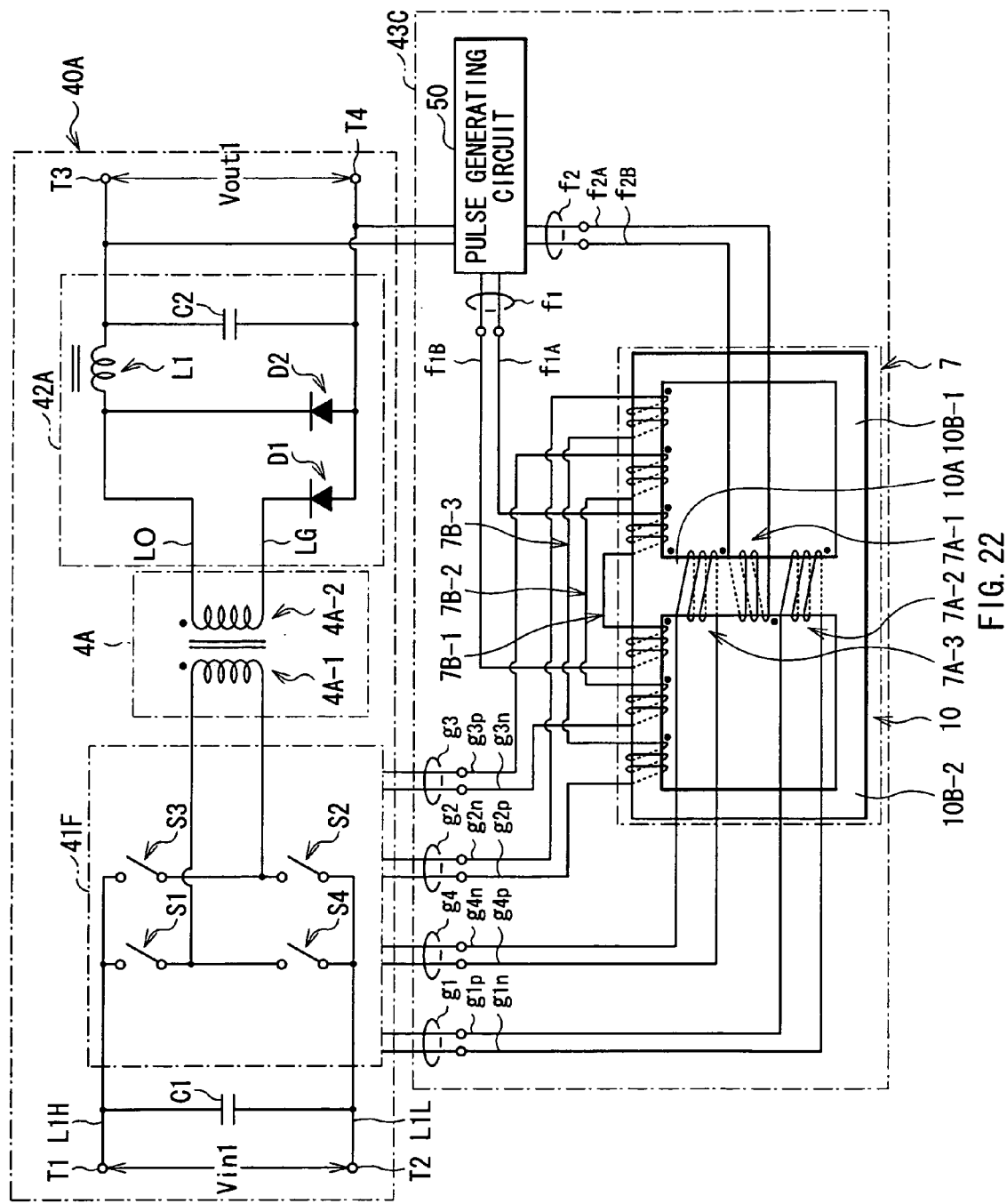
FIG. 22 is a circuit diagram of a driving circuit according to an application example of the magnetic element shown in FIG. 7.
Figure 24A:
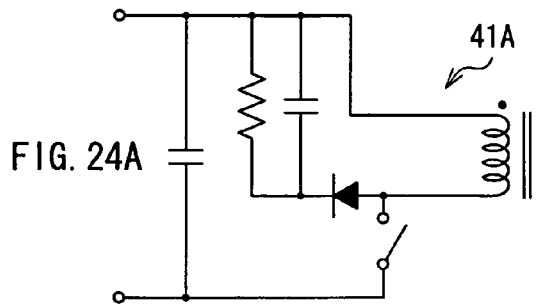
FIGS. 24A through 24F are circuit diagrams of switching circuits.
Figure 24B:
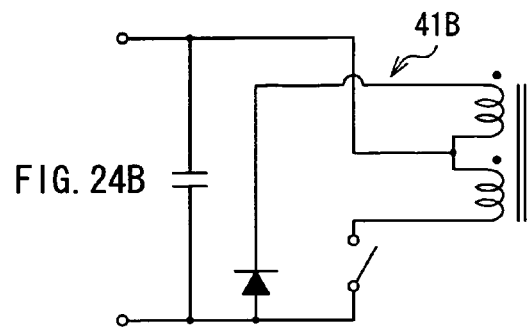
Figure 24C:
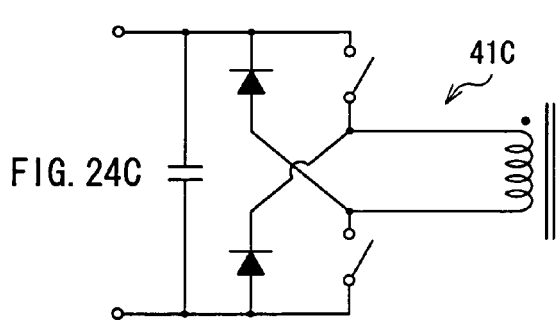
Figure 24D:
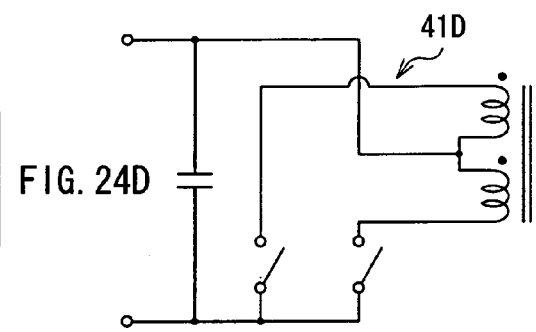
Figure 24E:
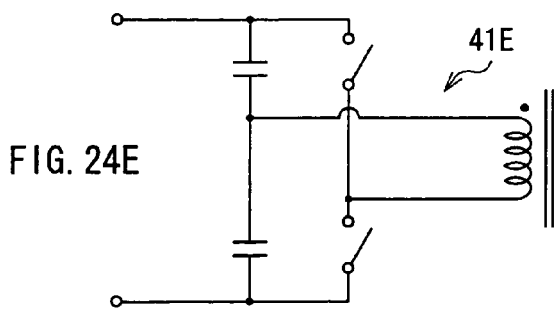
Figure 24F:
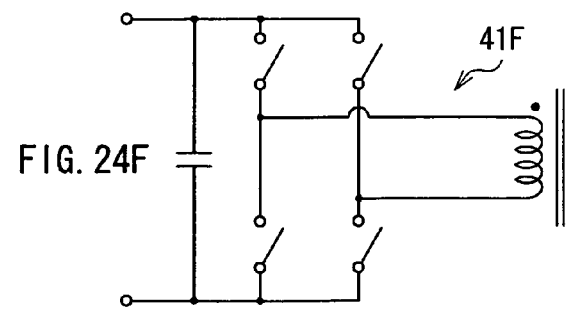
Figure 25A:
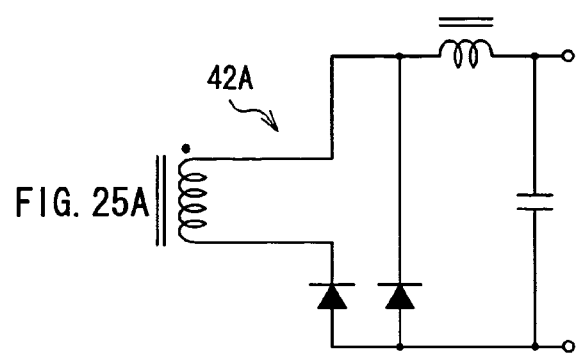
FIGS. 25A through 25D are circuit diagrams of rectifying/smoothing circuits.
Figure 25B:
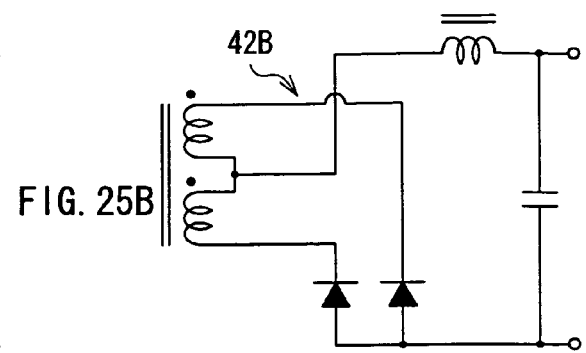
Figure 25C:
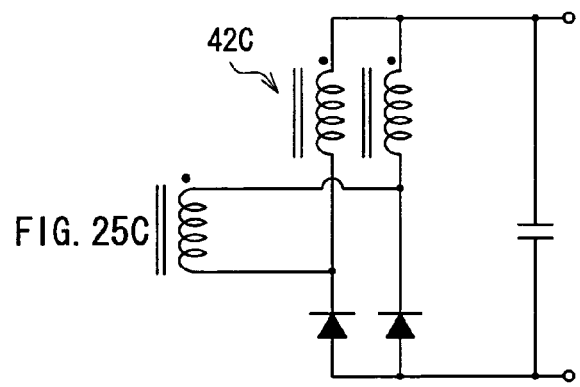
Figure 25D:
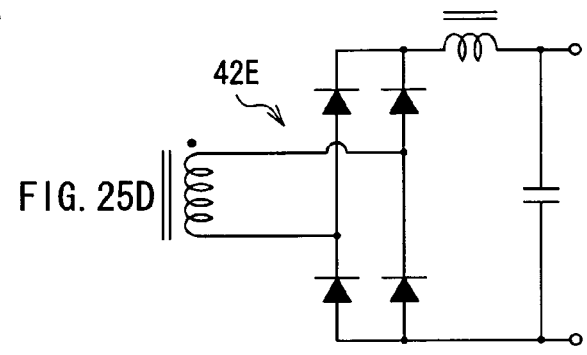

FIG. 22 shows a schematic structure of the driving circuit 43C using the magnetic element 7 (2-input/4-output type) according to the sixth modification. FIGS. 23A through 23F show waveform diagrams of input AC voltages f1 and f2 inputted into the magnetic element 7 and output AC voltages g1 through g4 outputted from the magnetic element 7.

The driving circuit 43C includes the magnetic element 7 and a pulse generating circuit 50. The pulse generating circuit 50 is connected to the output terminals T3 and T4 of the power supply 40E, the primary winding 7A-1 (the input inner leg coil 31A) and the primary winding 7B-1 (the input outer leg coil 32A) of the magnetic element 7, and is driven by the output DC voltage Vout1 outputted from the output terminals T3 and T4, and as shown in FIGS. 23A and 23B, the driving circuit 43C inputs two input AC voltages, that is, the input AC voltages f1 and f2 into the magnetic element 7. Moreover, the magnetic element 7 is connected to the pulse generating circuit 50 and the switching circuit 41F of the power supply 40E, and as shown in FIGS. 23C through 23F, the magnetic element 7 has a function as a 2-input/4-output type pulse transformer for signal transmission which converts two input AC voltages, that is, the input AC voltages f1 and f2 inputted from the pulse generating circuit 50 into four output AC voltages, that is, output AC voltages g1 (g1p-g1n), g2 (g2p-g2n), g3 (g3p-g3n) and g4 (g4p-g4n).

Thus, the driving circuit 43C according to the application example is driven by the output DC voltage Vout1 outputted from the output terminals T3 and T4, and outputs the output AC voltages g1 through g4 to the switching circuit 41F of the power supply 40E via the insulating type magnetic element 7, so even if an overvoltage such as surge voltage is inputted from the input terminals T1 and T2 of the power supply 40E, there is no possibility that the switching circuit 41F of the power supply 40E and the rectifying/smoothing circuit 42A are short-circuited through the driving circuit 43C. Moreover, the driving circuit 43C has the same functions and the same effects as those of the magnetic element 7.

The present invention is described referring to a plurality of embodiments and a plurality of application examples; however, the invention is not limited to them, and can be variously modified.

For example, in the embodiment, the inner leg coil 11 and the outer leg coil 12 are of a 1-input/1-output type or a 1-input/2-output type; however, they may be of any other input/output type.

Moreover, in the embodiments, two loop magnetic paths (the first outer leg portion 10B-1 and the second outer leg portion 10B-2) are arranged; however, three or more loop magnetic paths may be arranged. In particular, in the case where 2n (n is a positive integer) number of loop magnetic paths are arranged, a maximum of n number of outer leg coils 12, 22 and 32 can be included. At this time, the magnetic element includes n+1 number of inputs and a number which is an integer equal to or larger than n+1 of outputs as a whole. In the case where three or more loop magnetic paths are included, a jth outer leg portion 10B-j (j is a positive integer) around which the outer leg coils 12, 22 and 32 are not wound may be included.

Moreover, in the above application examples, the switching circuit is of the forward type 41A, the double forward type 41C or the full bridge type 41F as shown in FIGS. 26A, 26C and 26F; however, the switching circuit may be of a forward type with a reset winding 41B, a push-pull type 41D and a half bridge type 41E as shown in FIGS. 26B, 26D and 26E. Further, the rectifying/smoothing circuit is of a forward type 42A or a center tap type 42B as shown in FIGS. 27A and 27B; however, the rectifying/smoothing circuit may be of a current doubler type 42C or a full bridge type 42D as shown in FIGS. 27C and 27D.

Obviously many modifications and variations of the present invention are possible in the light of the above teachings. It is therefore to be understood that within the scope of the appended claims the invention may be practiced otherwise than as specifically described.

What is claimed is:

1. A power supply, comprising:
   a magnetic element which transforms a first input AC voltage and a second input AC voltage to output them as a first output AC voltage and a second output AC voltage; and
   a rectifying/smoothing circuit which rectifies and smoothes the first and the second output AC voltages,
   wherein the magnetic element includes:
   a magnetic core including an inner leg portion and a plurality of outer leg portions which share the inner leg portion, the plurality of outer leg portions each of which forms a loop magnetic path together with the inner leg portion;
   an input inner leg coil which is wound around the inner leg portion, the input inner leg coil into which the first output AC voltage is inputted;
   an output inner leg coil which is wound around the inner leg portion, and outputs the first output AC voltage;
   an input outer leg coil which is wound around the outer leg portion, the input outer leg coil into which the second input AC voltage is inputted; and
   an output outer leg coil which is wound around the outer leg portion, and outputs the second output AC voltage,
   the input outer leg coil is formed through connecting a first input outer leg coil portion wound around an outer leg portion of one loop magnetic path and a second input outer leg coil portion wound around an outer leg portion of another loop magnetic path in series,
   the output outer leg coil is formed through a first output outer leg coil portion wound around an outer leg portion of one loop magnetic path and a second output outer leg coil portion wound around an outer leg portion of another loop magnetic path in series,
   the winding directions of the first and the second input outer leg coil portions are in the same polarity direction, and the numbers of turns in the first input outer leg coil portion and the second input outer leg coil portion are equal to each other,
   the winding directions of the first and the second output outer leg coil portions are in the same polarity direction, and the numbers of turns in the first output outer leg coil portion and the second output outer leg coil portion are equal to each other,
   the input outer leg coil is wound around the outer leg portions so that magnetic fluxes generated in the plurality of outer leg portions by a current flowing through the input outer leg coil cancel each other out in the inner leg portion, and
   the output outer leg coil is wound around the outer leg portions so that magnetic fluxes generated in the plurality of outer leg portions by a current flowing through the output outer leg coil cancel each other out in the inner leg portion.

2. The power supply according to claim 1, wherein the turn ratio between the input inner leg coil and the output inner leg coil is different from the turn ratio between the input outer leg coil and the output outer leg coil.

3. The power supply according to claim 1, further comprising:
   a first switching circuit and a second switching circuit which generate the first input AC voltage and the second input AC voltage, respectively, through switching a DC input voltage.

4. The power supply according to claim 1, wherein the turn ratio between the input inner leg coil and the output inner leg coil is different from the turn ratio between the input outer leg coil and the output outer leg coil, and
   a first switching circuit and a second switching circuit which generate the first input AC voltage and the second input AC voltage, respectively, through switching a DC input voltage.

5. The power supply according to claim 1, wherein a first switching circuit and a second switching circuit which generate the first input AC voltage and the second input AC voltage, respectively, through switching a DC input voltage, and both ends of the output inner leg coil and both ends of the output outer leg coil are connected to the rectifying/smoothing circuit in parallel.

6. The power supply according to claim 1, wherein the turn ratio between the input inner leg coil and the output inner leg coil is different from the turn ratio between the input outer leg coil and the output outer leg coil, a first switching circuit and a second switching circuit which generate the first input AC voltage and the second input AC voltage, respectively, through switching a DC input voltage, and both ends of the output inner leg coil and both ends of the output outer leg coil are connected to the rectifying/smoothing circuit in parallel.

7. The power supply according to claim 1, further comprising:

a first switching circuit and a second switching circuit which generate the first input AC voltage and the second input AC voltage, respectively, through switching a DC input voltage; and a driving circuit which drives the first switching circuit and the second switching circuit at the same time.

8. The power supply according to claim 1, wherein a first switching circuit and a second switching circuit which generate the first input AC voltage and the second input AC voltage, respectively, through switching a DC input voltage, both ends of the output inner leg coil and both ends of the output outer leg coil are connected to the rectifying/smoothing circuit in parallel, and a driving circuit which drives the first switching circuit and the second switching circuit at the same time.

9. The power supply according to claim 1, further comprising:

a first switching circuit and a second switching circuit which generate the first input AC voltage and the second input AC voltage, respectively, through switching a DC input voltage, and a driving circuit which selectively switches between the first and the second switching circuits so as to drive either of them.

10. The power supply according to claim 1, wherein a first switching circuit and a second switching circuit which generate the first input AC voltage and the second input AC voltage, respectively, through switching a DC input voltage, both ends of the output outer leg coil are connected to the rectifying/smoothing circuit in parallel, and a driving circuit which selectively switches between the first and the second switching circuits so as to drive either of them.

11. The power supply, comprising:

a full bridge type switching circuit which switches a DC input voltage to generate an input AC voltage;

a magnetic element which transforms the input AC voltage to output the voltage as an output AC voltage;

a rectifying/smoothing circuit which rectifies and smoothes the output AC voltage; and a driving circuit which includes a pulse generating circuit generating a pulse voltage to be supplied to the switching circuit, the driving circuit which drives the switching circuit by the first through the fourth output pulse signal voltages outputted from the magnetic element, wherein the magnetic element, comprising:

a magnetic core including an inner leg portion and a plurality of outer leg portions which share the inner leg portion, the plurality of outer leg portions each of which forms a loop magnetic path together with the inner leg portion;

an inner leg coil wound around the inner leg portion; and an outer leg coil wound around the outer leg portions, wherein the outer leg coil is formed through connecting a first outer leg coil portion wound around an outer leg portion of one loop magnetic path and a second outer leg coil portion wound around an outer leg portion of another loop magnetic path in series, the winding directions of the first and the second outer leg coil portions are in the same polarity direction, and the numbers of turns in the first outer leg coil portion and the second outer leg coil portion are equal to each other, the outer leg coil is wound around the outer leg portion so that magnetic fluxes generated in the plurality of outer leg portions by a current flowing through the outer leg coil cancel each other out in the inner leg portion, the inner leg coil includes:

an input inner leg coil into which a first input pulse signal voltage is inputted, and a first output inner leg coil and a second output inner leg coil which output a first output pulse signal voltage and a second output pulse signal voltage corresponding to the first input pulse signal voltage, respectively, the outer leg coil includes:

an input outer leg coil into which a second input pulse signal voltage is inputted, and a first output outer leg coil and a second outer leg coil which output a third output pulse signal voltage and a fourth output pulse signal voltage corresponding to the second input pulse signal voltage, respectively, each of the input outer leg coil and the first and the second output outer leg coils is formed through connecting the first outer leg coil portion wound around an outer leg portion of one loop magnetic path and the second outer leg coil portion wound around an outer leg portion of another loop magnetic path in series, the winding directions of the first and the second outer leg coil portions are in the same polarity direction, and the numbers of turns in the first outer leg coil portion and the second outer leg coil portion are equal to each other, the input outer leg coil is wound around the outer leg portion so that magnetic fluxes generated in the plurality of outer leg portions by a current flowing through the outer leg coil cancel each other out in the inner leg portion, the first output outer leg coil is wound around the outer leg portion so that magnetic fluxes generated in the plurality of outer leg portions by a current flowing through the first output outer leg coil cancel each other out in the inner leg portion, and the second output outer leg coil is wound around the outer leg portion so that magnetic fluxes generated in the plurality of outer leg portions by a current flowing through the second output outer leg coil cancel each other out in the inner leg portion.

\* \* \* \* \*